(12) United States Patent
Ito et al.

(10) Patent No.: US 12,292,217 B2
(45) Date of Patent: May 6, 2025

(54) MOTOR-DRIVEN COMPRESSOR

(71) Applicant: KABUSHIKI KAISHA TOYOTA JIDOSHOKKI, Kariya (JP)

(72) Inventors: Shun Ito, Kariya (JP); Yoshiki Nagata, Kariya (JP); Takashi Kawashima, Kariya (JP); Hiroshi Fukasaku, Kariya (JP); Shunsuke Ambo, Kariya (JP); Kazuhiro Shiraishi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/599,842

(22) Filed: Mar. 8, 2024

(65) Prior Publication Data
US 2024/0310088 A1  Sep. 19, 2024

(30) Foreign Application Priority Data

Mar. 14, 2023 (JP) ................. 2023-039643
Jul. 5, 2023 (JP) ................. 2023-110987

(51) Int. Cl.
| | |
|---|---|
| H02K 11/33 | (2016.01) |
| F04C 18/02 | (2006.01) |
| F04C 29/06 | (2006.01) |
| F25B 31/02 | (2006.01) |
| H02K 7/14 | (2006.01) |

(52) U.S. Cl.
CPC ........ F25B 31/026 (2013.01); F04C 18/0215 (2013.01); F04C 29/06 (2013.01); H02K 7/14 (2013.01); H02K 11/33 (2016.01); F04C 2240/40 (2013.01)

(58) Field of Classification Search
CPC .. F04C 18/0215; F04C 2240/40; F04C 29/06; F25B 31/026; H02K 11/33; H02K 7/14
See application file for complete search history.

(56) References Cited

U.S. PATENT DOCUMENTS

| | | | |
|---|---|---|---|
| 2020/0321836 A1 | 10/2020 | Kagawa et al. | |
| 2021/0090776 A1* | 3/2021 | Fukasaku | ............ F04C 29/0085 |
| 2021/0320566 A1* | 10/2021 | Yamamoto | ............... H02K 5/06 |

FOREIGN PATENT DOCUMENTS

WO   2017/170817 A1   10/2017

* cited by examiner

*Primary Examiner* — Naishadh N Desai
(74) *Attorney, Agent, or Firm* — Sughrue Mion, PLLC

(57) ABSTRACT

A noise reducing unit includes a common mode choke coil and a first damping portion that is made of a nonmagnetic material. The common mode choke coil includes an annular core, a first winding wound around the core, and a second winding wound around the core and spaced apart from the first winding. The first damping portion surrounds the first winding and the second winding. The first damping portion is configured such that an induced current flows in the first damping portion to generate magnetic flux that resists changes in leakage flux leaking from the core. The noise reducing unit further includes a second damping portion that is made of a magnetic material. The second damping portion is disposed on an opposite side of the first damping portion from the common mode choke coil.

9 Claims, 11 Drawing Sheets

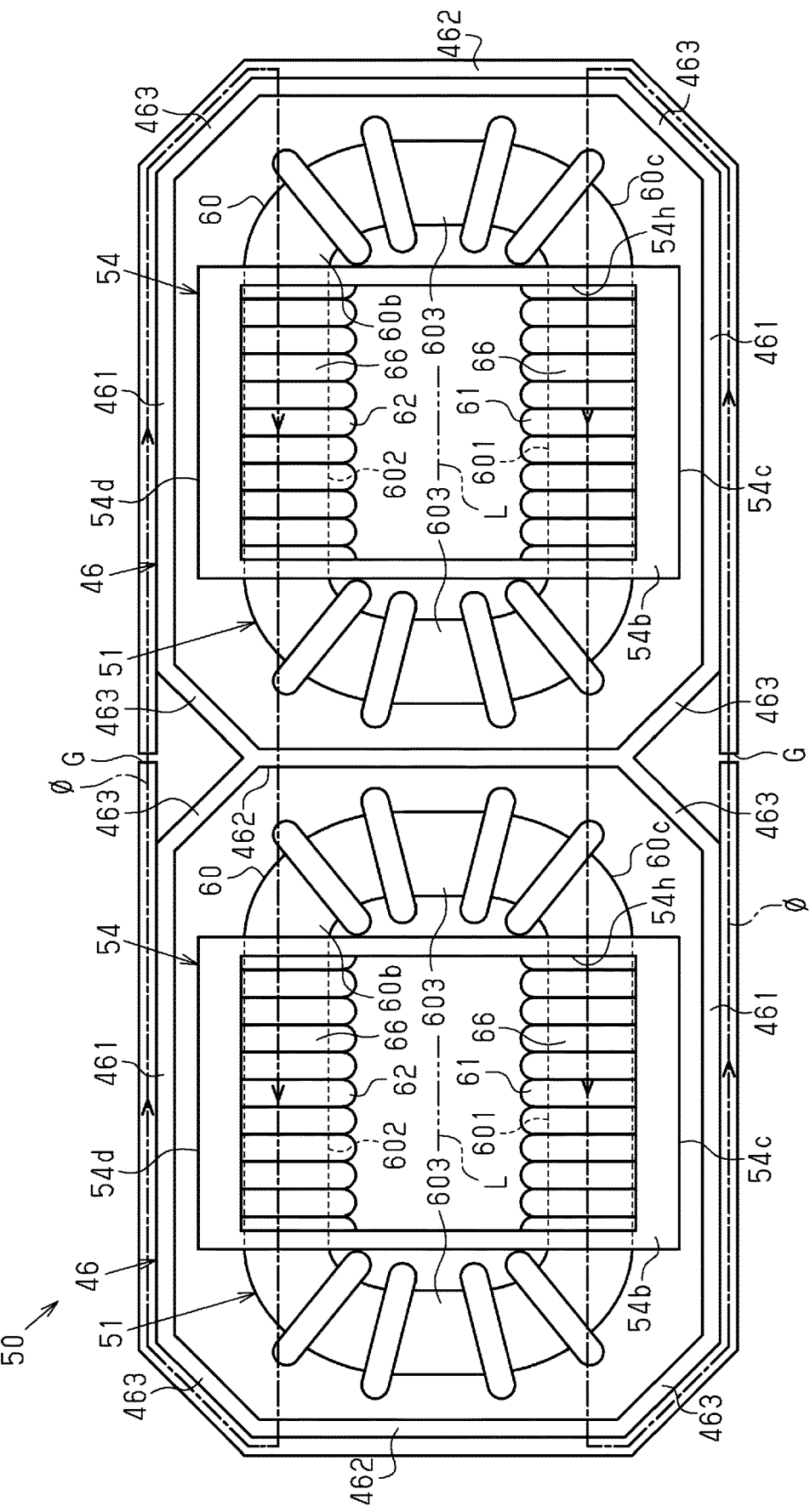

MOTOR-DRIVEN COMPRESSOR

BACKGROUND

1. Field

The present disclosure relates to a motor-driven compressor.

2. Description of Related Art

International Publication No. 2017/170817 discloses a motor-driven compressor that includes a compression unit, which compresses a fluid, a motor, which drives the compression unit, an inverter device, which drives the motor, and a housing, which accommodates the compression unit, the motor, and the inverter device. The inverter device includes an inverter circuit unit and a noise reducing unit. The inverter circuit unit converts DC power into AC power. The noise reducing unit is arranged on the input side of the inverter circuit unit. The noise reducing unit reduces common-mode noise and normal-mode noise.

The noise reducing unit includes a common mode choke coil, a smoothing capacitor, and a damping portion. The common mode choke coil includes an annular core, a first winding wound around the core, and a second winding wound around the core and spaced apart from the first winding. The common mode choke coil reduces common-mode noise. The smoothing capacitor forms a low-pass filter circuit together with the common mode choke coil. The damping portion is made of a nonmagnetic material. The damping portion surrounds the first winding and the second winding.

When a normal mode current flows through the first winding and the second winding, magnetic flux leaks from the core. An induced current flows in the damping portion to generate magnetic flux resisting changes in the leakage magnetic flux leaking from the core. The induced current in the damping portion is converted into thermal energy, thereby achieving a damping effect. The damping portion reduces normal-mode noise.

In such a motor-driven compressor, it is desirable to improve the damping effect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor includes a compression unit that is configured to compress a fluid, a motor that is configured to drive the compression unit, an inverter device configured to drive the motor, and a housing that accommodates the compression unit, the motor, and the inverter device. The inverter device includes an inverter circuit unit configured to convert DC power to AC power, and a noise reducing unit that is provided on an input side of the inverter circuit unit and is configured to reduce common-mode noise and normal-mode noise. The noise reducing unit includes a common mode choke coil that is configured to reduce the common-mode noise, a smoothing capacitor that forms a low-pass filter together with the common mode choke coil, and a first damping portion that is made of a nonmagnetic material and is configured to reduce the normal-mode noise. The common mode choke coil includes an annular core, a first winding that is wound around the core, and a second winding that is wound around the core and spaced apart from the first winding. The first damping portion is configured to surround the first winding and the second winding. The first damping portion is configured such that an induced current flows in the first damping portion to generate magnetic flux that resists changes in leakage flux leaking from the core. The noise reducing unit further includes a second damping portion that is made of a magnetic material and is configured to reduce the normal-mode noise. The second damping portion is disposed on an opposite side of the first damping portion from the common mode choke coil.

Other features and aspects will be apparent from the following detailed description, the drawings, and the claims.

BRIEF DESCRIPTION OF THE DRAWINGS

FIG. 14 is a front view showing a noise reducing unit according to a further modification.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to one embodiment will now be described with reference to FIGS. 1 to 8. The motor-driven compressor 10 of the present embodiment is mounted on a vehicle. The motor-driven compressor 10 of the present embodiment is used in a vehicle air conditioner 100.

Vehicle Air Conditioner

Figure 1:
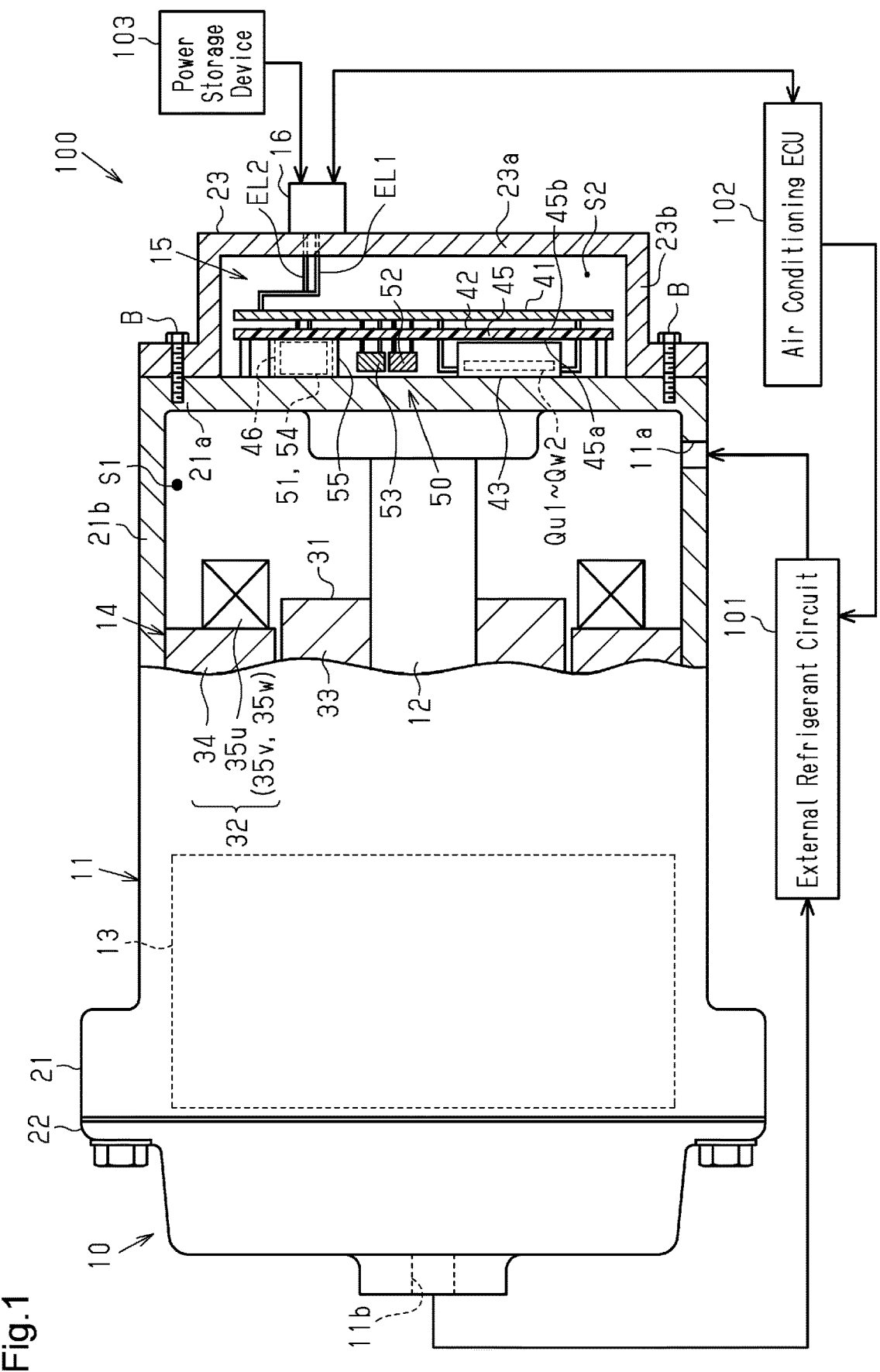
FIG. 1 is a cross-sectional side view of a motor-driven compressor according to one embodiment.

As shown in FIG. 1, the vehicle air conditioner 100 includes the motor-driven compressor 10 and an external refrigerant circuit 101. The external refrigerant circuit 101 supplies a fluid, which is refrigerant, to the motor-driven compressor 10. The external refrigerant circuit 101 includes, for example, a heat exchanger and an expansion valve (neither is shown). The motor-driven compressor 10 compresses the refrigerant, and the external refrigerant circuit 101 performs heat exchange of the refrigerant and expands the refrigerant. This allows the vehicle air conditioner 100 to cool or warm the passenger compartment.

The vehicle air conditioner 100 includes an air conditioning ECU 102. The air conditioning ECU 102 controls the entire vehicle air conditioner 100. The air conditioning ECU 102 is configured to obtain the temperature of the passenger compartment and a target temperature of the passenger compartment that is set by a user. Based on parameters such as the temperature of the passenger compartment and the target temperature, the air conditioning ECU 102 outputs various commands such as ON-OFF commands to the motor-driven compressor 10.

Motor-Driven Compressor

The motor-driven compressor 10 includes a housing 11, a rotary shaft 12, a compression unit 13, which compresses refrigerant, a motor 14, which drives the compression unit 13, and an inverter device 15, which drives the motor 14.

The housing 11 accommodates the rotary shaft 12, the compression unit 13, the motor 14, and the inverter device 15. The housing 11 is made of metal. The housing 11 of the present embodiment is made of aluminum. The housing 11 is grounded to the body of the vehicle. The housing 11 includes a suction housing member 21, a discharge housing member 22, and an inverter housing member 23.

The suction housing member 21 includes a plate-shaped end wall 21a and a tubular peripheral wall 21b that extends from an outer periphery of the end wall 21a. The discharge housing member 22 is coupled to an open end of the suction housing member 21. The discharge housing member 22 closes the opening of the suction housing member 21. The suction housing member 21 and the discharge housing member 22 define a suction chamber S1. The rotary shaft 12, the compression unit 13, and the motor 14 are accommodated in the suction chamber S1. The motor 14 is located in the suction chamber S1 between the compression unit 13 and the end wall 21a of the suction housing member 21.

The inverter housing member 23 includes a plate-shaped end wall 23a and a tubular peripheral wall 23b, which extends from the outer periphery of the end wall 23a. The inverter housing member 23 is coupled to the end wall 21a of the suction housing member 21 with bolts B. The end wall 21a of the suction housing member 21 and the inverter housing member 23 define an inverter accommodating chamber S2. The inverter device 15 is accommodated in the inverter accommodating chamber S2.

A connector 16 is attached to the end wall 23a of the inverter housing member 23. The connector 16 is electrically connected to a power storage device 103 mounted on the vehicle. The power storage device 103 is a power supply that supplies power to devices mounted on the vehicle. The power storage device 103 is a DC power supply. The power storage device 103 is, for example, a rechargeable battery or a capacitor.

The housing 11 includes a suction port 11a. The suction port 11a is provided in the peripheral wall 21b of the suction housing member 21. The suction port 11a is formed in a part of the peripheral wall 21b of the suction housing member 21 at a position closer to the end wall 21a than to the discharge housing member 22. The housing 11 includes a discharge port 11b. The discharge port 11b is formed in the discharge housing member 22. The suction port 11a is connected to one end of the external refrigerant circuit 101, and the discharge port 11b is connected to the other end of the external refrigerant circuit 101.

The rotary shaft 12 is rotatably supported by the housing 11. The axial direction of the rotary shaft 12 agrees with the axial direction of the peripheral wall 21b of the suction housing member 21.

The compression unit 13 is coupled to the rotary shaft 12. When the rotary shaft 12 rotates, the compression unit 13 compresses refrigerant. The compression unit 13 is, for example, of a scroll type and includes a fixed scroll (not shown) fixed to the suction housing member 21 and an orbiting scroll (not shown) arranged to be opposed to the fixed scroll.

The motor 14 includes a rotor 31 and a stator 32.

The rotor 31 includes a cylindrical rotor core 33 and permanent magnets (not shown), which are provided in the rotor core 33. The rotary shaft 12 is inserted into the rotor core 33. The rotary shaft 12 is fixed to the rotor core 33. The rotary shaft 12 is rotatable integrally with the rotor 31.

The stator 32 faces the rotor 31 in the radial direction of the rotary shaft 12. The stator 32 includes a cylindrical stator core 34, a u-phase coil 35u, a v-phase coil 35v, and a w-phase coil 35w. The stator core 34 is fixed to the inner circumferential surface of the peripheral wall 21b of the suction housing member 21. The u-phase coil 35u, the v-phase coil 35v, and the w-phase coil 35w are wound around the stator core 34. The u-phase coil 35u, the v-phase coil 35v, and the w-phase coil 35w are connected to form a Y-connection, for example. The manner in which the u-phase coil 35u, the v-phase coil 35v, and w-phase coil 35w are connected together is not limited to a Y-connection. The manner in which the u-phase coil 35u, the v-phase coil 35v, and the w-phase coil 35w may be, for example, a delta connection.

The rotor 31 rotates when the u-phase coil 35u, the v-phase coil 35v, and the w-phase coil 35w are energized in a specified pattern. When the rotor 31 rotates, the rotary shaft 12 rotates. This drives the compression unit 13. The motor 14 thus drives the compression unit 13. The compression unit 13 compresses refrigerant that has been drawn into the suction chamber S1 from the external refrigerant circuit 101 through the suction port 11a. The refrigerant compressed by the compression unit 13 is discharged to the external refrigerant circuit 101 through the discharge port 11*b*.

Figure 2:
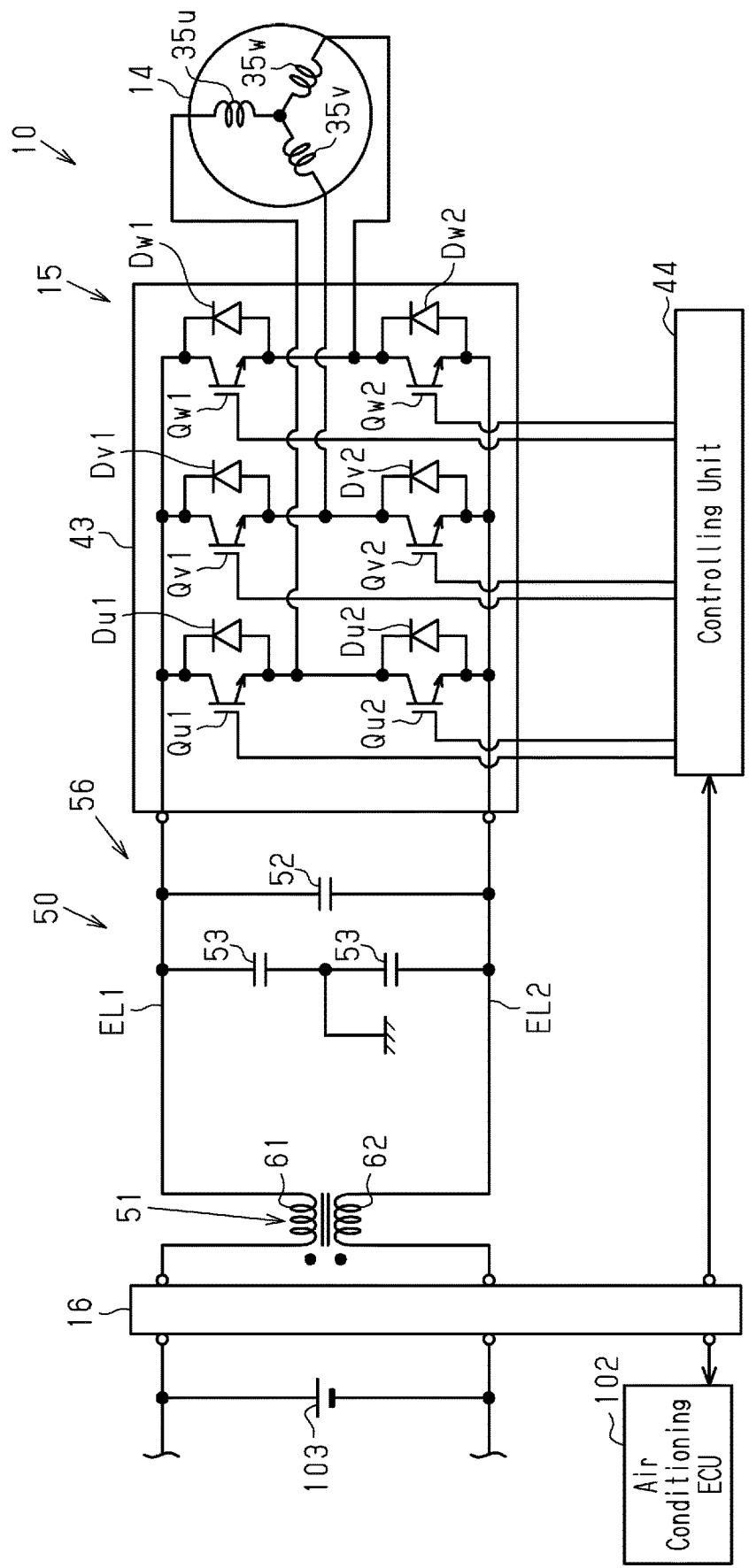
FIG. 2 is a circuit diagram showing the electrical configuration of the motor-driven compressor shown in FIG. 1.

As shown in FIGS. 1 and 2, the inverter device 15 includes a circuit board 41, a holder 42, an inverter circuit unit 43, a controlling unit 44, and a noise reducing unit 50.

The circuit board 41 is disposed between the end wall 21*a* of the suction housing member 21 and the end wall 23*a* of the inverter housing member 23 in the axial direction of the rotary shaft 12. The thickness direction of the circuit board 41 agrees with the axial direction of the rotary shaft 12.

The holder 42 is made of plastic. The holder 42 is disposed between the circuit board 41 and the end wall 21*a* of the suction housing member 21.

The holder 42 includes a plate-shaped main body 45. The thickness direction of the main body 45 agrees with the axial direction of the rotary shaft 12. The main body 45 includes a first surface 45*a* and a second surface 45*b*. The first surface 45*a* and the second surface 45*b* are orthogonal to the thickness direction of the main body 45. The first surface 45*a* of the main body 45 faces the end wall 21*a* of the suction housing member 21. The second surface 45*b* of the main body 45 faces the circuit board 41.

Figure 3:
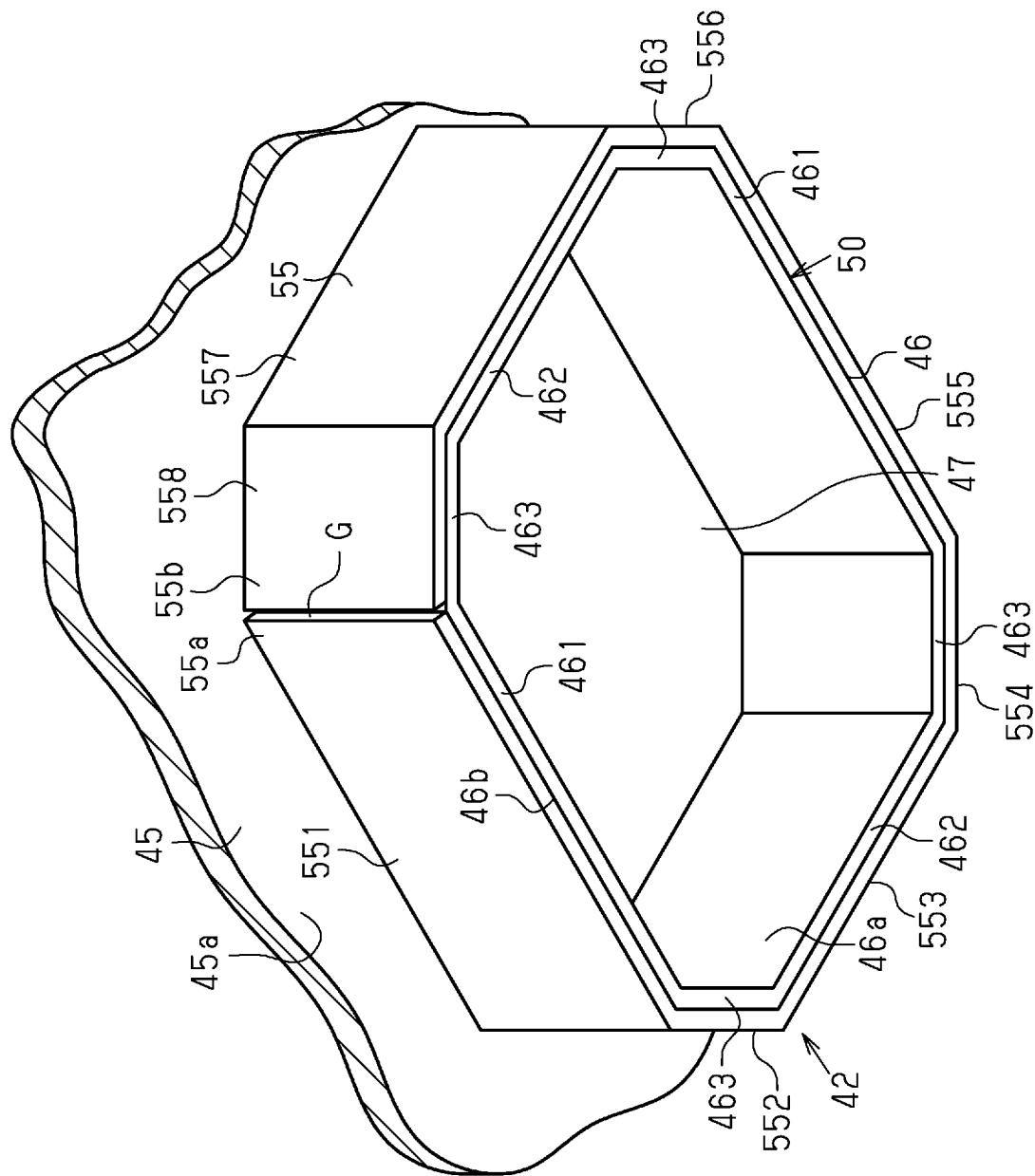
FIG. 3 is a perspective view showing a part of a holder and a second damping portion of the motor-driven compressor shown in FIG. 1.

As shown in FIG. 3, the holder 42 includes a tubular portion 46 extending from the first surface 45*a* of the main body 45. The first surface 45*a* of the main body 45 and the inner peripheral surface 46*a* of the tubular portion 46 define an accommodation space 47.

The tubular portion 46 of the present embodiment has an octagonal shape. The tubular portion 46 includes two first walls 461, two second walls 462, and four third walls 463. The two first walls 461 face each other in a direction parallel to the first surface 45*a*. The two second walls 462 face each other in a direction that is orthogonal to the direction in which the two first walls 461 face each other. The third walls 463 connect the first wall 461 and the second wall 462, which are adjacent to each other in the circumferential direction of the tubular portion 46.

The inverter circuit unit 43 converts DC power into AC power. In the present embodiment, the inverter circuit unit 43 is disposed between the main body 45 of the holder 42 and the end wall 21*a* of the suction housing member 21 in the axial direction of the rotary shaft 12. The inverter circuit unit 43 is mounted on the circuit board 41.

As shown in FIG. 2, the inverter circuit unit 43 includes two connection lines EL1, EL2. The inverter circuit unit 43 includes u-phase switching elements Qu1, Qu2, which correspond to the u-phase coil 35*u*. The inverter circuit unit 43 includes v-phase switching elements Qv1, Qv2, which correspond to the v-phase coil 35*v*. The inverter circuit unit 43 includes w-phase switching elements Qw1, Qw2, which correspond to the w-phase coil 35*w*. Each of the switching elements Qu1 to Qw2 is, for example, a power switching element such as an insulated gate bipolar transistor (IGBT). The switching elements Qu1, Qu2, Qv1, Qv2, Qw1, Qw2 are respectively connected to freewheeling diodes Du1, Du2, Dv1, Dv2, Dw1, Dw2.

The u-phase switching elements Qu1, Qu2 are connected in series. The connecting point between the u-phase switching elements Qu1, Qu2 is connected to the u-phase coil 35*u*. A serially-connected body (leg) of the u-phase switching elements Qu1, Qu2 is electrically connected to the connection lines EL1, EL2.

The v-phase switching elements Qv1, Qv2 are connected in series. The connecting point between the v-phase switching elements Qv1, Qv2 is connected to the v-phase coil 35*v*. A serially-connected body of the v-phase switching elements Qv1, Qv2 is electrically connected to the connection lines EL1, EL2.

The w-phase switching elements Qw1, Qw2 are connected in series. The connecting point between the w-phase switching elements Qw1, Qw2 is connected to the w-phase coil 35*w*. A serially-connected body of the w-phase switching elements Qw1, Qw2 is electrically connected to the connection lines EL1, EL2.

The serially-connected body of the u-phase switching elements Qu1, Qu2, the serially-connected body of the v-phase switching elements Qv1, Qv2, and the serially-connected body of the w-phase switching elements Qw1, Qw2 are connected in parallel with each other between the connection lines EL1, EL2.

The controlling unit 44, which is processing circuitry, controls the inverter circuit unit 43. The controlling unit 44 controls switching operations of the switching elements Qu1 to Qw2. The controlling unit 44 may include, for example, at least one dedicated hardware circuit and/or at least one processor (control circuit) that operates in accordance with a computer program (software). The processor includes a CPU and a memory such as a RAM and a ROM. The memory stores program codes or commands configured to cause the processor to execute various processes. The memory, or a computer-readable medium, includes any type of medium that is accessible by a general-purpose computer or a dedicated computer.

The controlling unit 44 is electrically connected to the air conditioning ECU 102 via the connector 16. Based on commands from the air conditioning ECU 102, the controlling unit 44 periodically turns on and off the switching elements Qu1 to Qw2. Specifically, based on commands from the air conditioning ECU 102, the controlling unit 44 performs pulse width modulation control (PWM control) on the switching elements Qu1 to Qw2. More specifically, the controlling unit 44 uses a carrier signal (carrier wave signal) and a commanded voltage value signal (signal for comparison) to generate control signals. The controlling unit 44 performs ON-OFF control of the switching elements Qu1 to Qw2 by using the generated control signals, thereby converting DC power to AC power.

Noise Reducing Unit

The noise reducing unit 50 is arranged on the input side of the inverter circuit unit 43. The noise reducing unit 50 reduces common-mode noise and normal-mode noise. In the present embodiment, the noise reducing unit 50 is disposed between the main body 45 of the holder 42 and the end wall 21*a* of the suction housing member 21 in the axial direction of the rotary shaft 12. The noise reducing unit 50 is mounted on the circuit board 41.

The noise reducing unit 50 includes a common mode choke coil 51 and a smoothing capacitor 52. The smoothing capacitor 52 forms a low-pass filter circuit 56 together with the common mode choke coil 51. The low-pass filter circuit 56 is provided on the connection lines EL1, EL2. The low-pass filter circuit 56 is provided between the connector 16 and the inverter circuit unit 43 in the circuit structure. The common mode choke coil 51 is provided on the connection lines EL1, EL2.

The smoothing capacitor 52 is provided between the common mode choke coils 51 and the inverter circuit unit 43. The smoothing capacitor 52 is an X capacitor, which is connected in parallel with the inverter circuit unit 43. The smoothing capacitor 52 is electrically connected to the connection lines EL1, EL2. The common mode choke coil 51 and the smoothing capacitor 52 form an LC resonance circuit. Thus, the low-pass filter circuit 56 of the present embodiment is an LC resonance circuit including the common mode choke coil 51.

The noise reducing unit 50 further includes two Y-capacitors 53. The two Y-capacitors 53 are connected in series. The connecting point between the two Y-capacitors 53 is grounded to the body of the vehicle via the housing 11. The two Y-capacitors 53 are provided between the common mode choke coil 51 and the inverter circuit unit 43. The two Y-capacitors 53 are connected in parallel with the common mode choke coil 51 and the smoothing capacitor 52. The two Y-capacitors 53 are located between the common mode choke coil 51 and the smoothing capacitor 52.

The common mode choke coil 51 limits transmission of high frequency noise generated in the vehicle to the inverter circuit unit 43 of the motor-driven compressor 10. The common mode choke coil 51 reduces common-mode noise. The common mode choke coil 51 uses the leakage inductance as a normal inductance. Accordingly, the common mode choke coil 51 is used as an L component in the low-pass filter circuit (LC filter) 56, which eliminates normal-mode noise (differential-mode noise). That is, the common mode choke coil 51 can cope with the common-mode noise and the normal-mode noise (differential-mode noise). In other words, the motor-driven compressor 10 of the present embodiment uses the common mode choke coil 51 to cope with common-mode noise and normal-mode noise (differential-mode noise), instead of using a choke coil for common mode and another choke coil for normal mode (differential mode).

Figure 4:
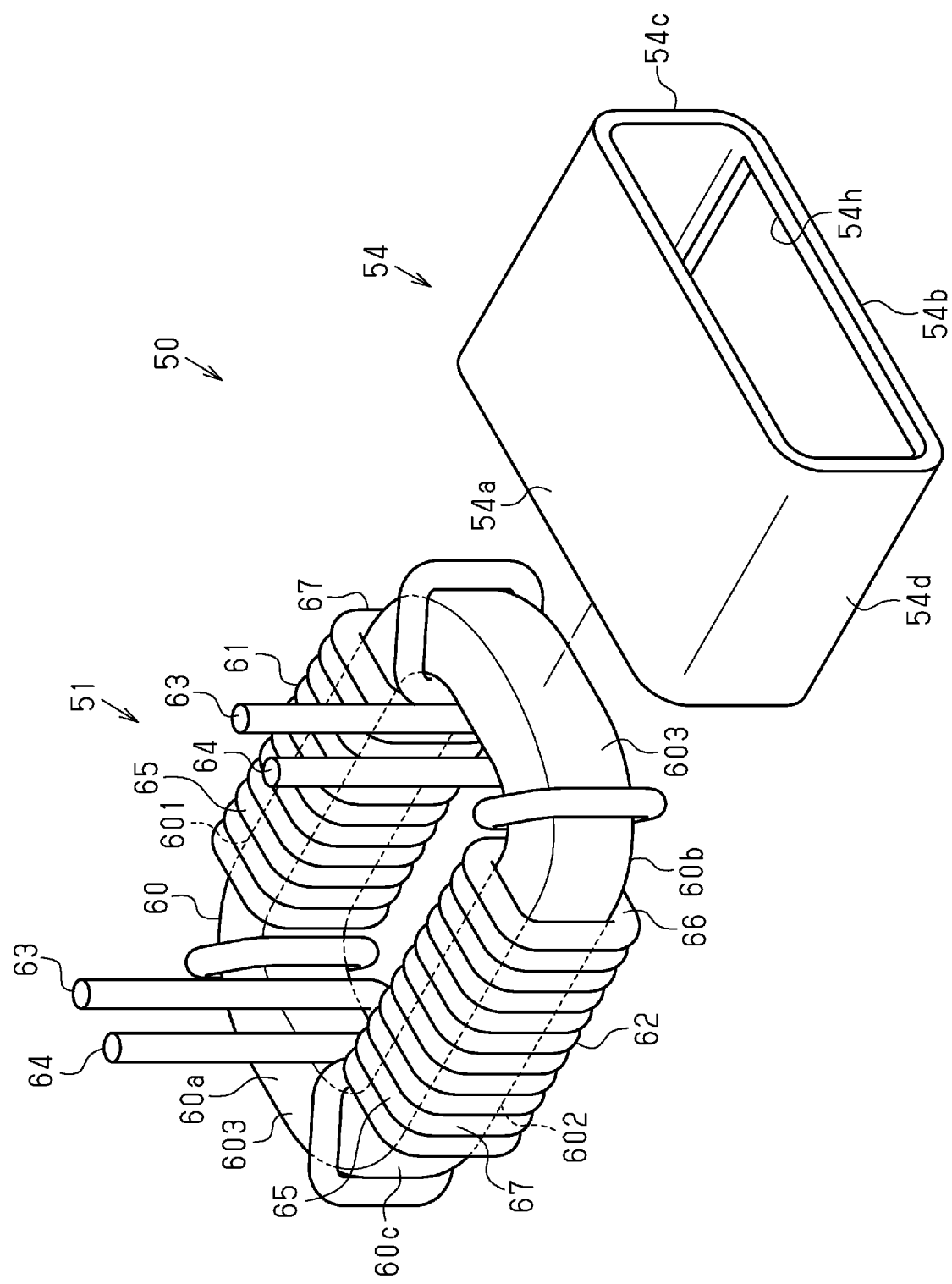
FIG. 4 is an exploded perspective view of a common mode choke coil and a first damping portion of the motor-driven compressor shown in FIG. 1.

As shown in FIG. 4, the common mode choke coil 51 includes a core 60, a first winding 61, and a second winding 62.

The core 60 is annular. In other words, the core 60 has the shape of an endless loop. The core 60 is made of a ferromagnetic material. The core 60 is, for example, a ferrite core. The core 60 includes a first spool portion 601, a second spool portion 602, and two coupling portions 603. The first spool portion 601 and the second spool portion 602 extend linearly. The first spool portion 601 and the second spool portion 602 extend parallel to each other. One coupling portion 603 couples one end of the first spool portion 601 to one end of the second spool portion 602, and the other coupling portion 603 couples the other end of the first spool portion 601 to the other end of the second spool portion 602. The core 60 includes a first end face 60a and a second end face 60b. The first end face 60a is one end face in the axial direction of the core 60, and the second end face 60b is the other end face in the axial direction of the core 60.

The first winding 61 is wound around the first spool portion 601 of the core 60. In the present embodiment, a part of the first winding 61 is also wound around the two coupling portions 603 of the core 60. The opposite ends of the first winding 61 are drawn out as two first leads 63 from the first end face 60a of the core 60.

The second winding 62 is wound around the second spool portion 602 of the core 60. In the present embodiment, a part of the second winding 62 is also wound around the two coupling portions 603 of the core 60. The second winding 62 is spaced apart from the first winding 61 in the circumferential direction of the core 60. Specifically, the second winding 62 is spaced apart from the first winding 61 by 1800 in the circumferential direction of the core 60 so as to face the first winding 61 in the radial direction of the core 60. The first winding 61 and the second winding 62 are arranged to be spaced apart from each other and arranged at an interval in a direction orthogonal to the axis of the core 60. The opposite ends of the second winding 62 are drawn out as two second leads 64 from the first end face 60a of the core 60.

The first winding 61 and the second winding 62 each include a first section 65, which is located on the first end face 60a of the core 60, a second section 66, which is located on the second end face 60b of the core 60, and a third section 67, which is located on an outer circumferential surface 60c of the core 60.

First Damping Portion

As shown in FIG. 4, the noise reducing unit 50 includes a plate-shaped first damping portion 54, which reduces normal-mode noise. The first damping portion 54 is made of a conductive nonmagnetic material. The first damping portion 54 is made of, for example, copper or aluminum.

The first damping portion 54 of the present embodiment is annular. In other words, the first damping portion 54 has the shape of an endless loop. The first damping portion 54 includes a first covering portion 54a, a second covering portion 54b, a third covering portion 54c, and a fourth covering portion 54d. The first covering portion 54a, the second covering portion 54b, the third covering portion 54c, and the fourth covering portion 54d each have the shape of a rectangular flat plate. The first covering portion 54a and the second covering portion 54b are parallel to each other. The second covering portion 54b includes a through-hole 54h. The through-hole 54h extends through the second covering portion 54b in the thickness direction. The third covering portion 54c couples an end of the first covering portion 54a in the longitudinal direction to an end of the second covering portion 54b in the longitudinal direction. The fourth covering portion 54d couples the other end of the first covering portion 54a in the longitudinal direction to the other end of the second covering portion 54b in the longitudinal direction. The third covering portion 54c and the fourth covering portion 54d are parallel to each other.

Figure 5:
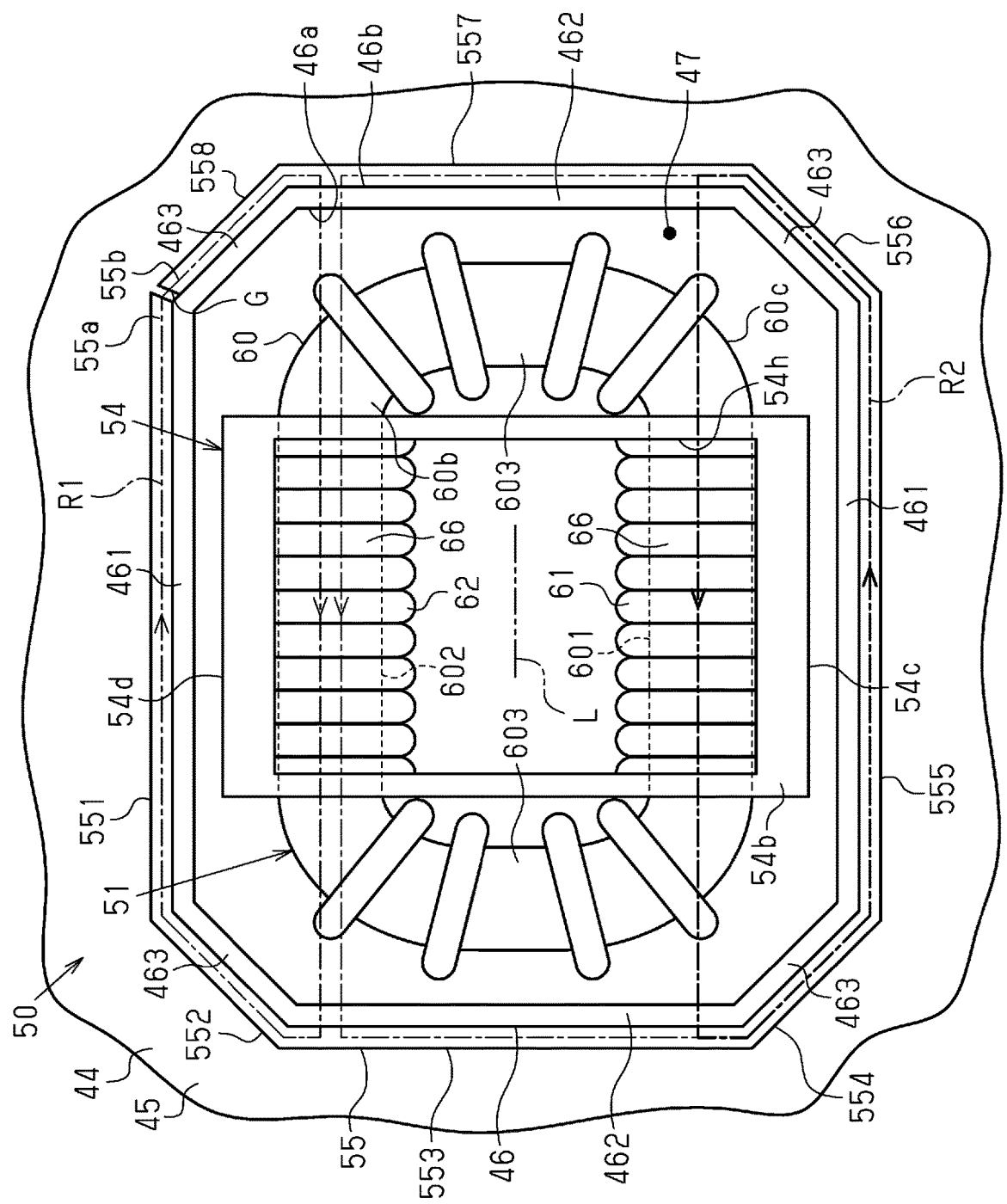
FIG. 5 is a front view showing a holder, the common mode choke coil, the first damping portion, and a second damping portion of the motor-driven compressor shown in FIG. 1.
Figure 6:
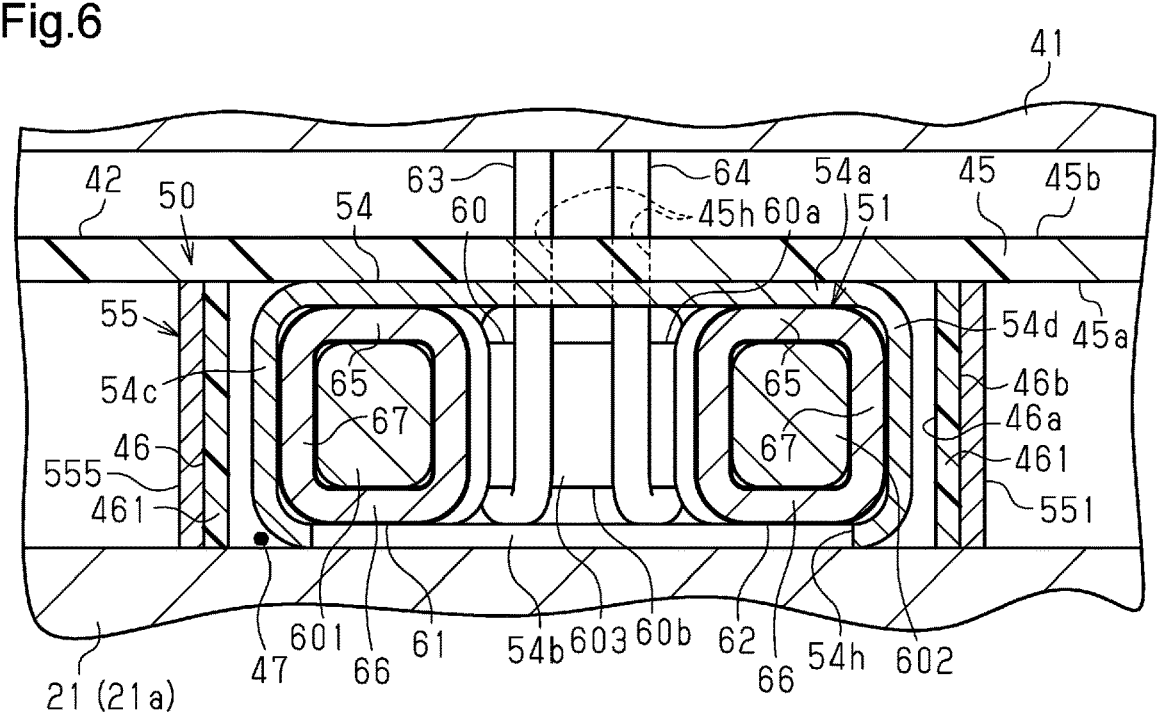
FIG. 6 is a partial cross-sectional view showing a part of the motor-driven compressor shown in FIG. 1.

As shown in FIGS. 5 and 6, a part of the common mode choke coil 51 is disposed inside the first damping portion 54. The axial direction of the core 60 and the axial direction of the first damping portion 54 are orthogonal to each other. The first spool portion 601 and the second spool portion 602 of the core 60, a portion of the first winding 61 that is wound around the first spool portion 601, and a portion of the second winding 62 that is wound around the second spool portion 602 are located inside the first damping portion 54. The two coupling portions 603 of the core 60, portions of the first winding 61 that are wound around the coupling portions 603, and portions of the second winding 62 that are wound around the coupling portions 603 are located outside the first damping portion 54. The two first leads 63 are located on the opposite sides in the axial direction of the first damping portion 54. The two second leads 64 are located on the opposite sides in the axial direction of the first damping portion 54.

The first covering portion 54a and the second covering portion 54b are arranged on the opposite sides of the common mode choke coil 51 in the axial direction of the core 60. The first covering portion 54a faces the first end face 60a of the core 60. The second covering portion 54b faces the second end face 60b of the core 60. The first covering portion 54a covers the first sections 65 of the first winding 61 and the second winding 62. The second covering portion 54b covers the second sections 66 of the first winding 61 and the second winding 62.

The third covering portion 54c and the fourth covering portion 54d are arranged on the opposite sides of the common mode choke coil 51 in a direction in which the first winding 61 and the second winding 62 face each other. The third covering portion 54c covers the third section 67 of the first winding 61. The fourth covering portion 54d covers the third section 67 of the second winding 62.

As described above, the first damping portion 54 surrounds the first winding 61 and the second winding 62. The first damping portion 54 covers the first sections 65, the second sections 66, and the third sections 67 of the first winding 61 and the second winding 62.

The common mode choke coil 51 and the first damping portion 54 are accommodated in the accommodation space 47 of the holder 42. The axial direction of the core 60 agrees with the axial direction of the tubular portion 46. The first covering portion 54a includes a first surface, which faces the common mode choke coil 51, and a second surface, which is on a side opposite to the first surface and faces the first surface 45a of the main body 45 of the holder 42. The first leads 63 and the second leads 64 are respectively inserted into an insertion holes 45h, which extend through the main body 45. The first leads 63 and the second leads 64 are soldered to, for example, the circuit board 41. This electrically connects the first winding 61 and the second winding 62 to the circuit board 41. The second covering portion 54b includes a first surface, which faces the common mode choke coil 51, and a second surface, which is on a side opposite to the first surface and faces the outer surface of the end wall 21a of the suction housing member 21. Thermal paste (not shown) is provided between the second surface of the second covering portion 54b and the outer surface of the end wall 21a. The third covering portion 54c and the fourth covering portion 54d each include a first surface, which faces the common mode choke coil 51, and a second surface, which is on a side opposite to the first surface and faces the inner surface of the first wall 461 of the tubular portion 46.

Second Damping Portion

As shown in FIGS. 3 and 5, the noise reducing unit 50 includes a plate-shaped second damping portion 55, which reduces normal-mode noise. The second damping portion 55 is made of a conductive magnetic material. The second damping portion 55 is made of, for example, iron or magnetic steel. The thickness of the second damping portion 55 of the present embodiment is several hundred micrometers. In the drawings, the thickness of the second damping portion 55 is exaggerated.

The second damping portion 55 of the present embodiment is attached to the outer circumferential surface 46b of the tubular portion 46 through insert molding. The second damping portion 55 is provided on the outer surfaces of the first to third walls 461 to 463 of the tubular portion 46. Thus, the second damping portion 55 extends in the circumferential direction of the tubular portion 46 on the outer circumference of the tubular portion 46. That is, the second damping portion 55 extends in the circumferential direction of the core 60 on the outer circumference of the core 60 to surround the common mode choke coil 51.

The second damping portion 55 includes a first end 55a and a second end 55b. The first end 55a and the second end 55b are ends of the second damping portion 55 in the circumferential direction of the tubular portion 46. The second end 55b is located at a side opposite to the first end 55a. The second damping portion 55 includes first to eighth sections 551 to 558. The first to eighth sections 551 to 558 are arranged in that order from the first end 55a to the second end 55b of the second damping portion 55. The first section 551 is provided on the outer surface of one of the first walls 461 of the tubular portion 46. The fifth section 555 is provided on the outer surface of the other first wall 461 of the tubular portion 46. The third section 553 is provided on the outer surface of one of the second walls 462 of the tubular portion 46. The seventh section 557 is provided on the outer surface of the other second wall 462 of the tubular portion 46. The second section 552, the fourth section 554, the sixth section 556, and the eighth section 558 are provided on the outer surface of the third wall 463 of the tubular portion 46. Thus, the first end 55a and the second end 55b of the second damping portion 55 are located at the joint portion of one of the first walls 461 and one of the third walls 463.

The second damping portion 55 of the present embodiment includes a gap G, which increases the magnetic resistance in the extending direction of the second damping portion 55. That is, the second damping portion 55 includes the gap G, which increases the magnetic resistance in the circumferential direction of the core 60.

In the present embodiment, the gap G is provided in the second damping portion 55 so as to be asymmetrical with respect to an imaginary straight line L. The imaginary straight line L is orthogonal to both the axial direction of the core 60 and the direction in which the first winding 61 and the second winding 62 face each other, and is located at a middle position between the first winding 61 and the second winding 62. Specifically, the gap G is provided between the first end 55a and the second end 55b of the second damping portion 55. In other words, the gap G is provided between the first section 551 and the eighth section 558 of the second damping portion 55.

In the present embodiment, the gap G is provided over the entire second damping portion 55 in the thickness direction. The gap G is provided over the entire second damping portion 55 in the axial direction of the core 60. Thus, the second damping portion 55 is discontinuous in the extending direction of the second damping portion 55 due to the gap G. Thus, the first end 55a and the second end 55b are electrically disconnected from each other so that no current flows in the extending direction of the second damping portion 55.

Parts of the second damping portion 55 that are located on the outer surfaces of the two second walls 462 and the outer surfaces of the four third walls 463, that is, the second to fourth sections 552 to 554 and the sixth to eighth sections 556 to 558, cover the outer circumferential surface 60c of the two coupling portions 603 of the core 60 with the tubular portion 46 in between. A portion of the second damping portion 55 that is located on the outer surfaces of the two first walls 461, that is, the first section 551 and the fifth section 555, covers the outer surfaces of the third covering portion 54c and the fourth covering portion 54d of the first damping portion 54. That is, the second damping portion 55 is disposed on an opposite side of the first damping portion 54 from the common mode choke coil 51. As described above, the second damping portion 55 of the present embodiment extends in the circumferential direction of the core 60 to surround the common mode choke coil 51. Thus, the common mode choke coil 51 of the present embodiment is surrounded by the second damping portion 55, which is arranged on the opposite side of the first damping portion 54 from the common mode choke coil 51. One end face of the second damping portion 55 in the axial direction of the tubular portion 46 is in contact with the outer surface of the end wall 21a of the suction housing member 21.

Operation of Present Embodiment

Operation of the present embodiment will now be described.

When a normal mode current (differential mode current) flows through the first winding 61 and the second winding 62, magnetic flux leaks from the core 60 of the common mode choke coil 51.

The noise reducing unit 50 includes the first damping portion 54, which is made of a nonmagnetic material. The first damping portion 54 surrounds the first winding 61 and the second winding 62. Thus, the leakage magnetic flux leaking from the core 60 intersects with the first damping portion 54. This generates an induced current that flows in the circumferential direction of the first damping portion 54 due to electromagnetic induction so as to generate magnetic flux in the first damping portion 54 that resists changes in the leakage magnetic flux. The induced current in the first damping portion 54 is converted into thermal energy. This produces a damping effect.

The noise reducing unit 50 further includes the second damping portion 55, which is made of a magnetic material. The second damping portion 55 is disposed on the opposite side of the first damping portion 54 from the common mode choke coil 51. When leakage magnetic flux leaking from the core 60 flows through the second damping portion 55, an eddy current is generated in the second damping portion 55 by electromagnetic induction. The eddy current generated in the second damping portion 55 is converted into thermal energy. This also produces a damping effect.

Since the noise reducing unit 50 includes the first damping portion 54 and the second damping portion 55, the amount of current generated due to leakage magnetic flux is increased by an amount corresponding to the addition of the second damping portion 55 as compared to a case in which the noise reducing unit 50 includes only the first damping portion 54. Therefore, an excellent damping effect is produced.

The common mode choke coil 51 of the present embodiment is surrounded by the second damping portion 55, which is arranged on the opposite side of the first damping portion 54 from the common mode choke coil 51. The second damping portion 55 includes the gap G, which increases the magnetic resistance in the extending direction. The leakage magnetic flux leaking from the core 60 tends to flow more readily through the path in the second damping portion 55 that does not have the gap G, rather than through the path where the gap G is provided.

In the present embodiment, the gap G is asymmetrical with respect to the imaginary straight line L. Specifically, the gap G is provided between the first section 551 and the eighth section 558 of the second damping portion 55. Thus, as shown in FIG. 5, leakage magnetic flux leaking from the core 60 is more likely to flow through a path R2, which passes through the fifth section 555 of the second damping portion 55, than through a path R1, which passes through the first section 551. Therefore, the temperature of the fifth section 555 is higher than the temperature of the first section 551. That is, the temperature of the second damping portion 55 differs between an area on one side of the imaginary straight line L in which the first winding 61 is disposed and an area on the other side of the imaginary straight line L in which the second winding 62 is disposed.

As described above, one end face of the second damping portion 55 in the axial direction of the tubular portion 46 is in contact with the outer surface of the end wall 21a of the suction housing member 21. The heat of the second damping portion 55 is thus dissipated to the end wall 21a of the suction housing member 21. Further, thermal paste (not shown) is arranged between the second covering portion 54b of the first damping portion 54 and the end wall 21a of the suction housing member 21. The heat of the first damping portion 54 is thus dissipated to the end wall 21a of the suction housing member 21. Further, the heat of the first winding 61 and the second winding 62 is dissipated to the end wall 21a of the suction housing member 21 via the first damping portion 54. The heat of the first winding 61 and the second winding 62 is dissipated to the end wall 21a of the suction housing member 21 through the through-hole 54h. The end wall 21a of the suction housing member 21 is cooled by the refrigerant drawn into the suction chamber S1.

A case of a referential example shown in FIG. 7 will be described in which the second damping portion 55 is located between the third section 67 of the first winding 61 and the third covering portion 54c of the first damping portion 54, and between the third section 67 of the second winding 62 and the fourth covering portion 54d of the first damping portion 54. In this instance, the leakage magnetic flux leaking from the core 60 diverges into two paths: one is a loop φ1 passing through the second damping portion 55 inside the first damping portion 54, and the other is a loop φ2 that travels outside the first damping portion 54. The leakage magnetic flux that passes through the second damping portion 55 is magnetic flux that intersects with the first damping portion 54. The direction of the leakage magnetic flux that passes through the second damping portion 55 is opposite to the direction of the magnetic flux passing through the core 60 inside the first damping portion 54. As a result, the leakage magnetic flux passing through the second damping portion 55 cancels out the magnetic flux passing through core 60 inside the first damping portion 54, leading to a reduction in the magnetic flux intersecting with the first damping portion 54. In other words, the magnetic flux passing through the second damping portion 55 reduces the magnetic flux that intersects with the first damping portion 54. As the magnetic flux that intersects with the first damping portion 54 is reduced, the induced current in the first damping portion 54 is also reduced. This reduces the damping effect of the first damping portion 54.

Figure 7:
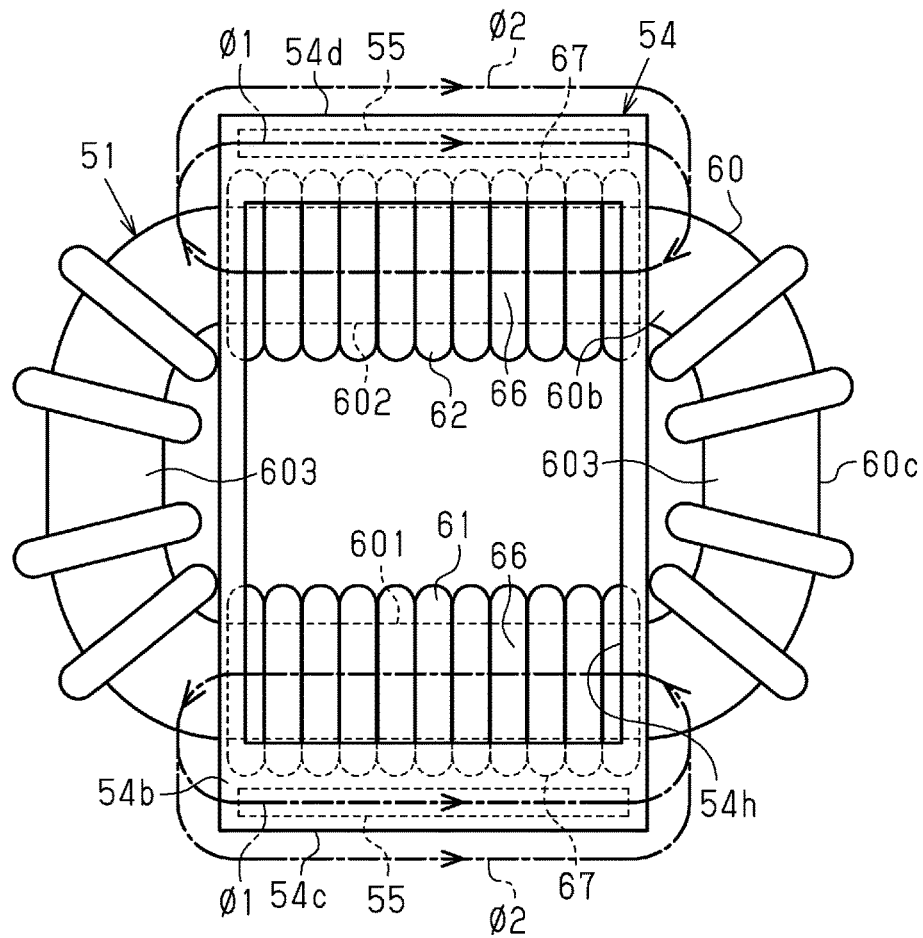
FIG. 7 is an explanatory diagram showing leakage magnetic flux in a referential example in which a second damping portion is disposed between windings and a first damping portion.

In the referential example shown in FIG. 7, the second damping portion 55 is located between the third section 67 of the first winding 61 and the third covering portion 54c of the first damping portion 54 and between the third section 67 of the second winding 62 and the fourth covering portion 54d of the first damping portion 54. However, the damping effect of the first damping portion 54 is also reduced even when the second damping portion 55 is located between the windings 61, 62 and the first covering portion 54a of the first damping portion 54. Also, the damping effect of the first damping portion 54 is reduced even when the second damping portion 55 is located between windings 61, 62 and the second covering portion 54b of the first damping portion 54. That is, the damping effect of the first damping portion 54 is reduced when the second damping portion 55 is located between the windings 61, 62 and the first damping portion 54.

In this regard, the second damping portion 55 is arranged on the outer side of the first damping portion 54 in the present embodiment. That is, the second damping portion 55 is on the opposite side of the first damping portion 54 from the common mode choke coil 51, so that the first damping portion 54 is arranged between the second damping portion 55 and the common mode choke coil 51. In this case, the loop φ1, which passes through the second damping portion 55, is not generated inside the first damping portion 54. Thus, the leakage magnetic flux leaking from the core 60 forms the loop φ2, which travels outside the first damping portion 54. Since the magnetic flux that intersects with the first damping portion 54 is not reduced, the induced current in the first damping portion 54 is not reduced. This prevents the damping effect of the first damping portion 54 from being reduced.

Figure 8:
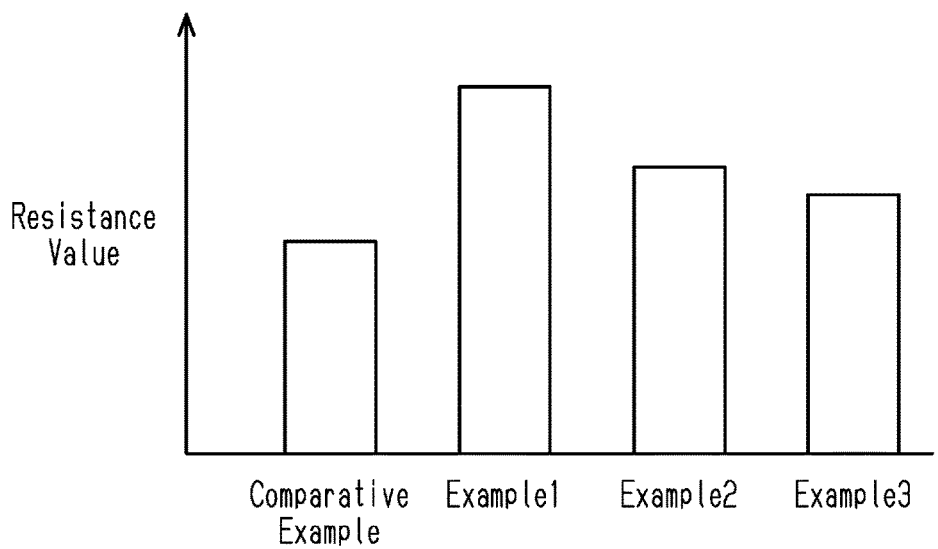
FIG. 8 is a graph showing total resistance values of the first damping portion and the second damping portion at a resonance frequency.

FIG. 8 is a graph showing the combined resistance values of the first damping portion 54 and the second damping portion 55 at the resonant frequency of the LC resonant circuit for a Comparative Example and Examples 1 to 3. The greater the resistance value, the better the damping effect becomes.

The noise reducing unit 50 of the Comparative Example includes the first damping portion 54, but does not include the second damping portion 55. In contrast, the noise reducing unit 50 of each of Examples 1 to 3 includes both of the first damping portion 54 and the second damping portion 55.

In Examples 1 to 3, the shape of the second damping portion 55 and the arrangement of the second damping portion 55 in relation to the common mode choke coil 51 and the first damping portion 54 are different from each other. Example 1 corresponds to the present embodiment. In Example 1, the second damping portion 55 extends in the circumferential direction of the core 60. In Example 1, the second damping portion 55 covers the outer circumferential surface 60c of the coupling portions 603 of the core 60, and the third covering portion 54c and the fourth covering portion 54d of the first damping portion 54. In Examples 2 and 3, the second damping portion 55 has the shape of a flat plate. In Example 2, the second damping portion 55 is arranged to cover the outer surface of the third covering portion 54c of the first damping portion 54. In Example 3, the second damping portion 55 is arranged to cover the outer surface of the first covering portion 54a of the first damping portion 54.

As is evident from FIG. 8, the resistance values of Examples 1 to 3 are greater than the resistance value of the Comparative Example. That is, since the noise reducing unit 50 includes the second damping portion 55 in addition to the first damping portion 54, an improved damping effect is achieved. Also, the resistance value of Example 1 is greater than those of Examples 2 and 3. In other words, by arranging the second damping portion 55 to extend in the circumferential direction of the core 60, an even more improved damping effect is achieved.

Advantages of Present Embodiment

The present embodiment has the following advantages.

(1) The noise reducing unit 50 includes the first damping portion 54, which is made of a nonmagnetic material. The first damping portion 54 surrounds the first winding 61 and the second winding 62. Thus, induced current flows in the first damping portion 54 to generate magnetic flux resisting changes in the leakage magnetic flux leaking from the core 60. The induced current in the first damping portion 54 is converted into thermal energy, thereby producing a damping effect.

The noise reducing unit 50 further includes the second damping portion 55, which is made of a magnetic material. The second damping portion 55 is on the opposite side of the first damping portion 54 from the common mode choke coil 51, so that the first damping portion 54 is arranged between the second damping portion 55 and the common mode choke coil 51. When leakage magnetic flux leaking from the core 60 flows through the second damping portion 55, an eddy current is generated in the second damping portion 55. The eddy current generated in the second damping portion 55 is converted into thermal energy. This also produces a damping effect.

Since the noise reducing unit 50 includes the first damping portion 54 and the second damping portion 55, the amount of current generated due to leakage magnetic flux is increased by an amount corresponding to the addition of the second damping portion 55 as compared to a case in which the noise reducing unit 50 includes only the first damping portion 54. Therefore, an excellent damping effect is produced.

(2) For example, if the second damping portion 55 is located between the windings 61, 62 and the first damping portion 54, the leakage magnetic flux leaking from the core 60 diverges into two paths: one is the loop φ1, which passes through the second damping portion 55 inside the first damping portion 54, and the other is the loop φ2, which travels outside the first damping portion 54. Then, the magnetic flux passing through the second damping portion 55 reduces the magnetic flux that intersects with the first damping portion 54, so that the induced current in the first damping portion 54 is also reduced. This reduces the damping effect of the first damping portion 54.

In the present embodiment, the second damping portion 55 is disposed on an opposite side of the first damping portion 54 from the common mode choke coil 51. Since this configuration prevents the magnetic flux passing through the second damping portion 55 from reducing the magnetic flux that intersects with the first damping portion 54, the induced current in the first damping portion 54 is not reduced. This prevents the damping effect of the first damping portion 54 from being reduced.

(3) The second damping portion 55 increases the leakage inductance of the common mode choke coil 51. This reduces the resonance frequency of the low-pass filter circuit 56. Therefore, the normal-mode noise in the frequency band higher than the resonance frequency is further reduced.

(4) The second damping portion 55 of the present embodiment extends in the circumferential direction of the core 60. This configuration further improves the damping effect compared to, for example, a case in which the flat plate-shaped second damping portion 55 is arranged to cover the outer surface of the third covering portion 54c of the first damping portion 54 or the outer surface of the first covering portion 54a, or a case in which the noise reducing unit 50 includes only the first damping portion 54.

(5) The inverter device 15 of the present embodiment includes the plastic holder 42, which includes the plate-shaped main body 45 and the tubular portion 46 extending from the main body 45. The common mode choke coil 51 and the first damping portion 54 are accommodated in the accommodation space 47, which is defined by the main body 45 and the tubular portions 46 such that the axial direction of the core 60 extends in the axial direction of the tubular portions 46. This configuration limits positional displacement of the common mode choke coil 51 and the first damping portion 54.

(6) The second damping portion 55 of the present embodiment is attached to the outer circumferential surface 46b of the tubular portion 46 of the holder 42. This configuration allows the second damping portion 55 to be readily coupled to the holder 42. The second damping portion 55 is arranged on the outer circumference of the tubular portion 46. This allows the second damping portion 55 to be insulated from the first damping portion 54 and the common mode choke coil 51 by the tubular portion 46.

(7) The common mode choke coil 51 of the present embodiment is surrounded by the second damping portion 55, which is arranged on the opposite side of the first damping portion 54 from the common mode choke coil 51. The second damping portion 55 includes the gap G, which increases the magnetic resistance in the extending direction. The leakage magnetic flux leaking from the core 60 tends to flow more readily through the path in the second damping portion 55 that does not have the gap G, rather than through the path where the gap G is provided.

In the present embodiment, the gap G is asymmetrical with respect to the imaginary straight line L. Thus, the ease of flow of leakage magnetic flux in the second damping portion 55 differs between the area on one side of the imaginary straight line L in which the first winding 61 is disposed and the area on the other side of the imaginary straight line L in which the second winding 62 is disposed. This allows the temperature of the second damping portion 55 to differ between the area on one side of the imaginary straight line L in which the first winding 61 is disposed and the area on the other side of the imaginary straight line L in which the second winding 62 is disposed.

Accordingly, for example, if a heat generating component is arranged only on one side of the second damping portion 55, the temperature of the second damping portion 55 can be adjusted such that the temperature of a part of the second damping portion 55 that is closer to the heat generating component is lower than the temperature of a part distant from the heat generating component. For example, if a cooling surface that can dissipate heat of the second damping portion 55 is arranged, for example, only on one side of the second damping portion 55 as in the case of the housing 11, the temperature of the second damping portion 55 can be adjusted such that the temperature of a part of the second damping portion 55 that is closer to the cooling surface is higher than the temperature of the part of the second damping portion 55 that is farther from the cooling surface. This efficiently dissipates heat from the second damping portion 55.

Modifications

The above-described embodiment may be changed as described below. The above-described embodiment and the following modifications can be combined as long as the combined modifications remain technically consistent with each other.

The inverter device 15 does not necessarily need to include the holder 42.

The tubular portion 46 of the holder 42 does not have to have the shape of an octagon as long as the tubular portion 46 is tubular. "Tubular" shapes as used in the present description include, but are not limited to, any structure having circular shape, an elliptic shape, and a polygonal shape with sharp or rounded corners.

The method for attaching the second damping portion 55 to the tubular portion 46 is not limited to insert molding. For example, the second damping portion 55 can be attached to the tubular portion 46 with an adhesive.

The shape of the second damping portion 55 may be changed. The second damping portion 55 may have, for example, the shape of a flat plate, or may be L-shaped or U-shaped.

The arrangement of the second damping portion 55 with respect to the common mode choke coil 51 and the first damping portion 54 may be changed as long as the second damping portion 55 is arranged on the opposite side of the first damping portion 54 from the common mode choke coil 51. The second damping portion 55 may be arranged to cover any one or more of the outer circumferential surface 60c of the two coupling portions 603 of the core 60 and the first to fourth covering portions 54a to 54d of the first damping portion 54.

The second damping portion 55 does not necessarily need to have the gap G. That is, the first end 55a and the second end 55b may be electrically connected to each other so that current flows in the extending direction of the second damping portion 55.

One end face of the second damping portion 55 in the axial direction of the tubular portion 46 does not necessarily need to be in contact with the outer surface of the end wall 21a of the suction housing member 21. In this case, thermal paste may be applied between one end face of the second damping portion 55 and the end wall 21a of the suction housing member 21.

Figure 9:
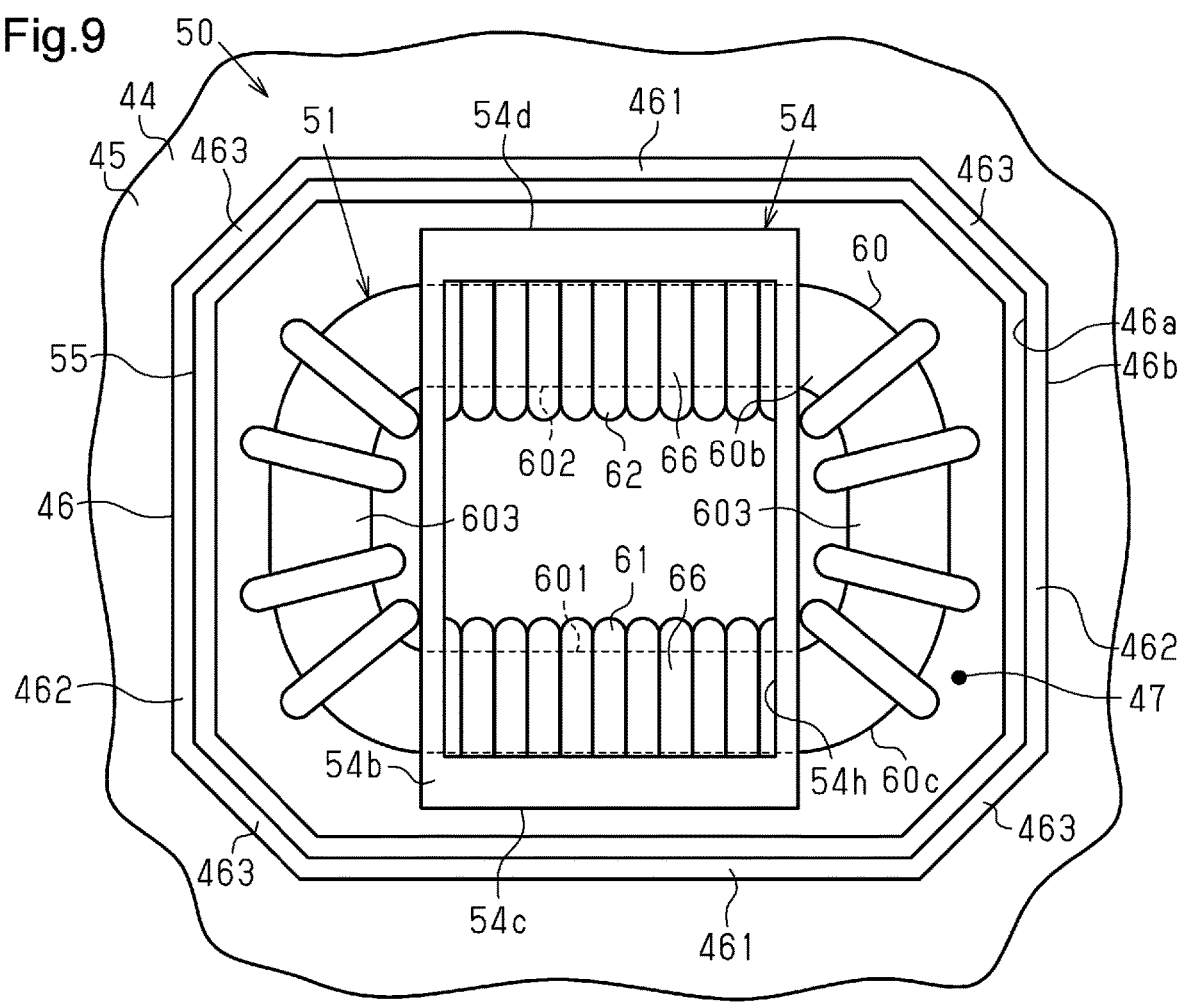
FIG. 9 is a front view showing a second damping portion according to a modification.

As shown in FIG. 9, the second damping portion 55 may be annular. In other words, the second damping portion 55 may have the shape of an endless loop. In FIG. 9, the second damping portion 55 is arranged such that the axial direction of the second damping portion 55 agrees with the axial direction of the core 60.

The axial direction of the second damping portion 55 does not necessarily need to agree with the axial direction of the core 60. The second damping portion 55 may be arranged such that the axial direction of the second damping portion 55 is orthogonal to the axial direction of the core 60. In this case, the axial direction of the second damping portion 55 may agree with the axial direction of the first damping portion 54 or may be orthogonal to the axial direction of the first damping portion 54.

As shown in FIG. 9, the second damping portion 55 may be attached to the inner peripheral surface 46a of the tubular portion 46. In this case, it is preferable to ensure insulation of the second damping portion 55 from the common mode choke coil 51 and the first damping portion 54. The method of ensuring insulation may be, for example, a method of securing an insulation distance from the second damping portion 55 to the common mode choke coil 51 and the first damping portion 54 or a method of performing an insulating treatment on the inner circumferential surface of the second damping portion 55. Since the second damping portion 55 is attached to the inner peripheral surface 46a of the tubular portion 46, the second damping portion 55 is easily attached to the holder 42. Also, the tubular portion 46 ensures insulation between the second damping portion 55 and other electronic components mounted on the circuit board 41. Further, since the second damping portion 55 can be brought closer to the core 60 than in a case in which the second damping portion 55 is arranged on the outer circumference of the tubular portion 46, the damping effect is improved.

Figure 10:
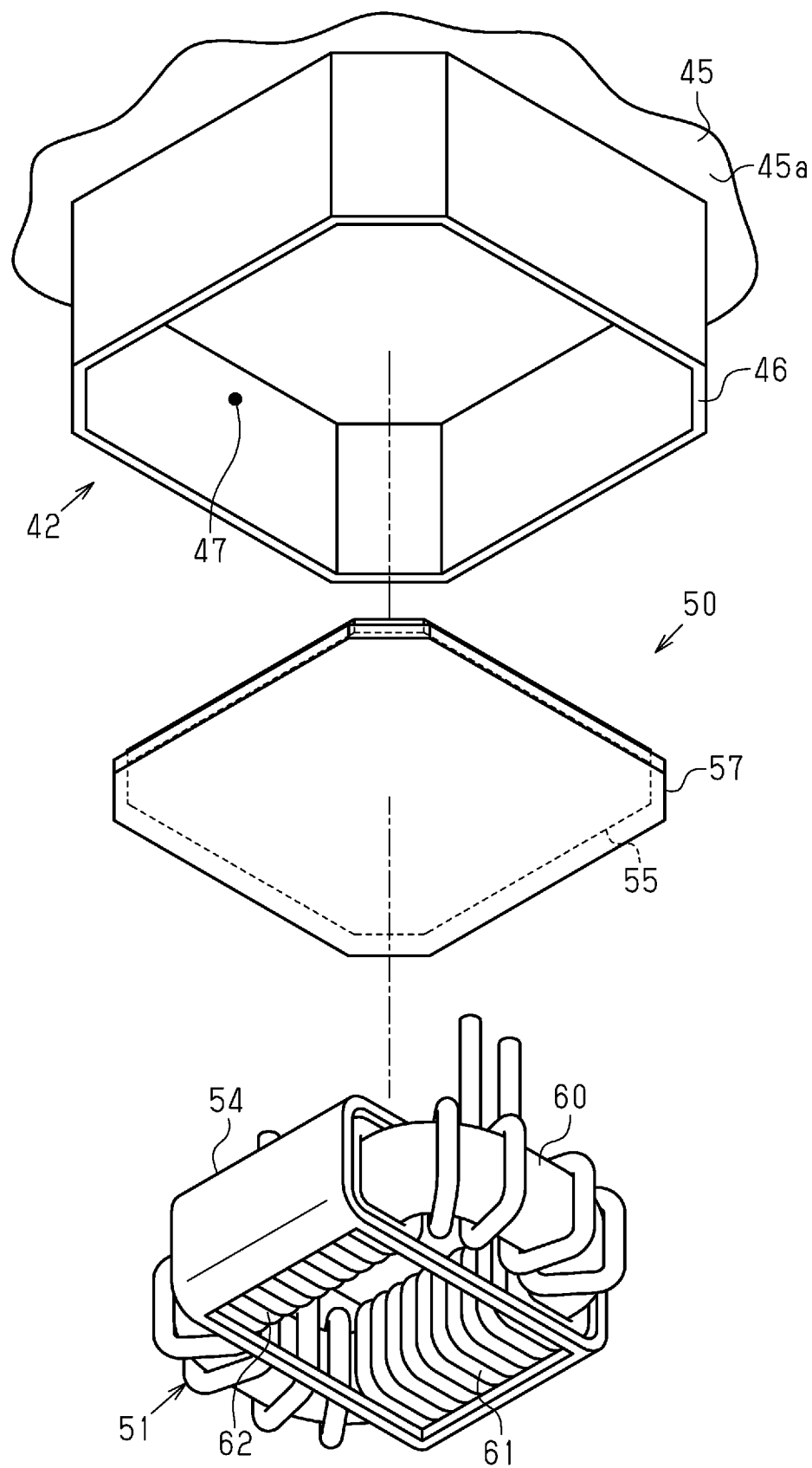
FIG. 10 is an exploded perspective view showing a second damping portion according to another modification.
Figure 11:
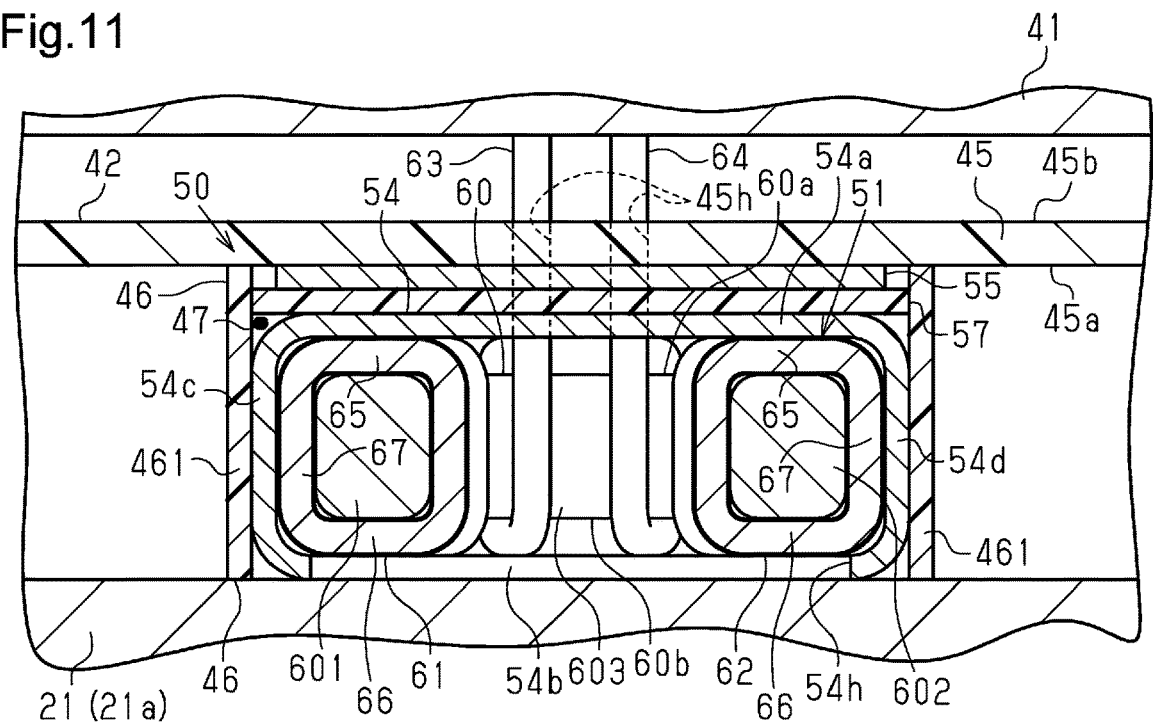
FIG. 11 is a partial cross-sectional view showing a part of a motor-driven compressor according to the modification shown in FIG. 10.

As shown in FIGS. 10 and 11, the noise reducing unit 50 may include a flat plastic base plate 57, and a flat-plate shaped second damping portion 55 may be attached to one surface of the base plate 57. The second damping portion 55 is attached to one side of the base plate 57, for example, through insert molding.

The second damping portion 55 and the base plate 57 are arranged between the first damping portion 54 and the main body 45 of the holder 42 in the axial direction of the tubular portion 46 and the core 60. The second damping portion 55 and the base plate 57 are held between the first damping portion 54 and the main body 45 in the axial direction of the tubular portion 46 and the core 60. The second damping portion 55 includes a first surface, which faces the base plate 57, and a second surface, which is on a side opposite to the first surface and faces the first surface 45a of the main body 45. The base plate 57 includes a first surface, which faces the second damping portion 55, and a second surface, which is on a side opposite to the first surface and faces the outer surface of the first covering portion 54a of the first damping portion 54.

Since the second damping portion 55 is arranged between the first damping portion 54 and the main body 45, the second damping portion 55 is readily attached to the first damping portion 54 and the holder 42. Also, the position of the second damping portion 55 is unlikely to be displaced. Further, the base plate 57 insulates the second damping portion 55 from the first damping portion 54 and the common mode choke coil 51.

In a case in which the second damping portion 55 is arranged between the first damping portion 54 and the main body 45 of the holder 42, the second damping portion 55 does not necessarily need to be attached to the base plate 57. In this case, it is preferable to ensure insulation of the second damping portion 55 from the common mode choke coil 51 and the first damping portion 54.

The second damping portion 55 may be incorporated in the tubular portion 46 through insert molding.

The shape of the core 60 may be changed as long as the core 60 is annular. "Annular" shapes as used in the present description include, but are not limited to, any structure having circular shape, an elliptic shape, and a polygonal shape with sharp or rounded corners.

In the above-described embodiment, the core 60 is formed by a single continuous member without a cut. However, the core 60 may be formed by two or more components.

The shape of the first damping portion 54 may be changed as long as the first damping portion 54 surrounds the first winding 61 and the second winding 62. The first damping portion 54 may, for example, annular and circular.

In the above-described embodiment, the first damping portion 54 is formed by a single continuous member without a cut. However, the first damping portion 54 may be formed by two or more components.

In the above-described embodiment, the noise reducing unit 50 includes a single second damping portion 55, but the noise reducing unit 50 may include multiple second damping portions 55.

Figure 12:
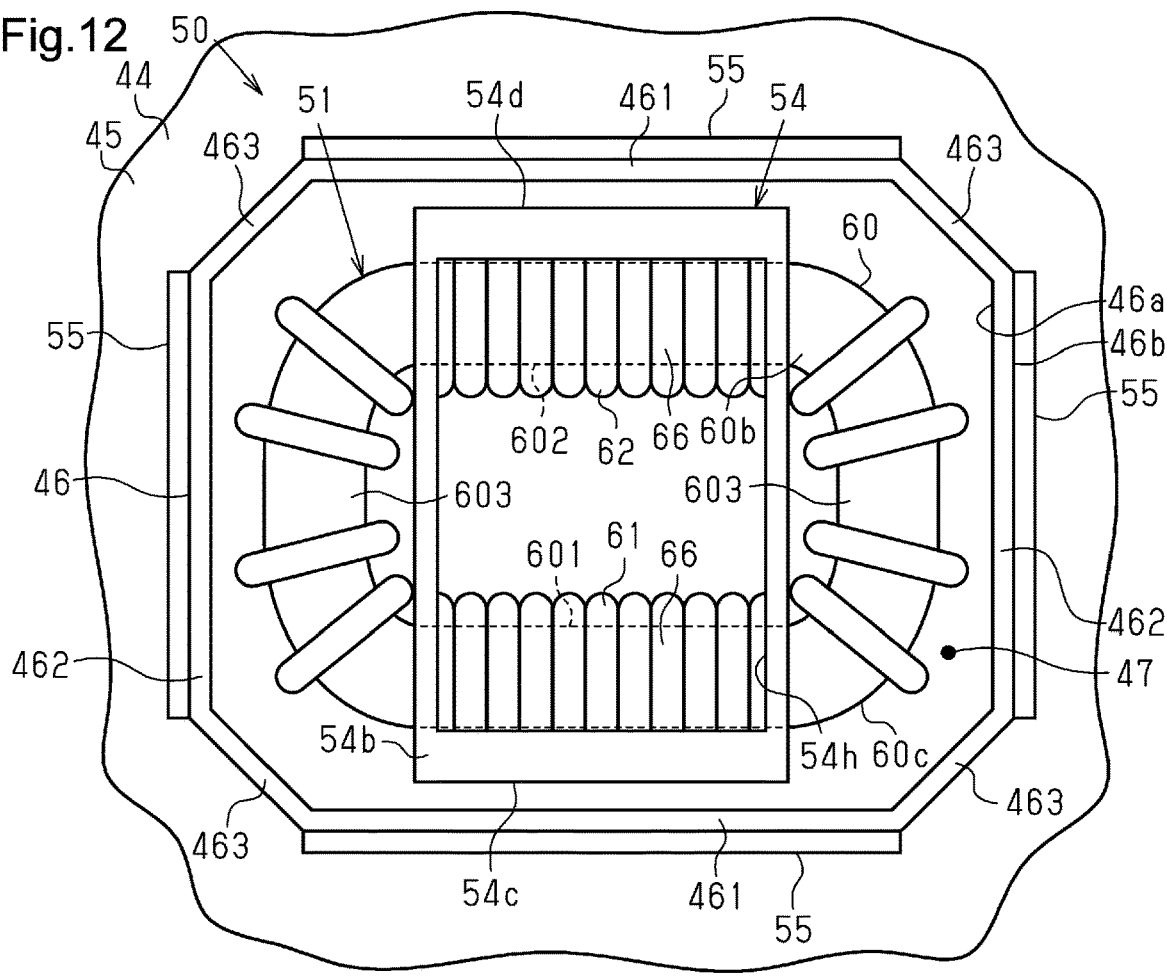
FIG. 12 is a front view showing a second damping portion according to another modification.

For example, the noise reducing unit 50 may include four flat plate-shaped second damping portions 55 as shown in FIG. 12. The four second damping portions 55 are arranged on the outer circumference of the core 60 in the circumferential direction of the core 60. The four second damping portions 55 are attached to the outer surface of the first walls 461 or the outer surface of the second wall 462 of the tubular portion 46. The second damping portions 55 are not provided on the outer surface of each third wall 463 of the tubular portion 46. This improves the damping effect as compared to a case in which the noise reducing unit 50 includes only one of the four second damping portions 55.

In the above-described embodiment, the gap G is provided between the first section 551 and the eighth section 558, but the present disclosure is not limited thereto. The gap G may be provided, for example, in the middle of the first section 551 in the extending direction. That is, the gap G may be provided not only between the above-described sections, but also in the middle of any of the sections.

Figure 13:
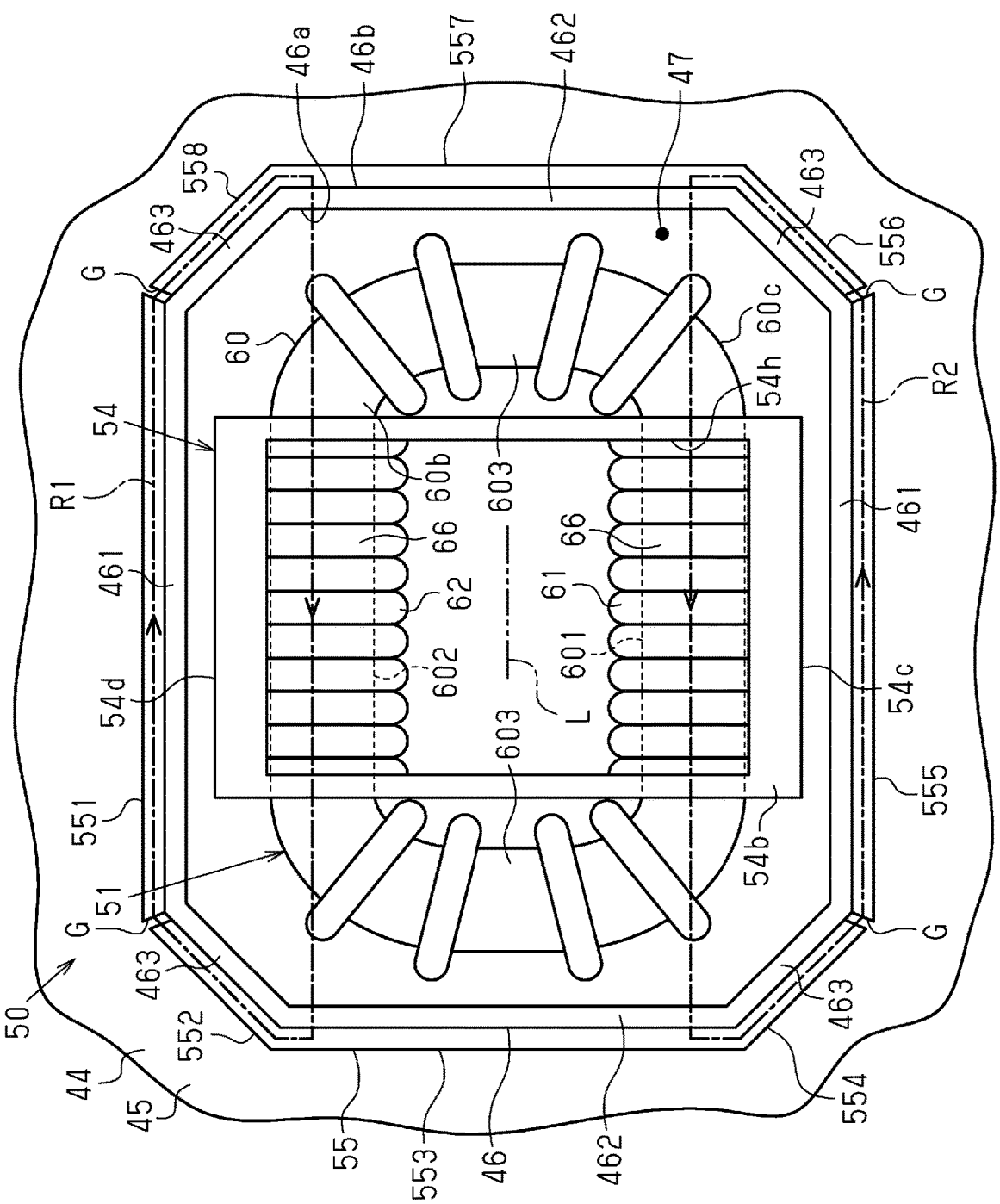
FIG. 13 is a front view showing a second damping portion in a further modification.

As shown in FIG. 13, the second damping portion 55 may be provided with multiple gaps G.

As shown in FIG. 13, the gaps G may be arranged to be symmetrical with respect to the imaginary straight line L.

For example, the gaps G are respectively provided between the first section 551 and the eighth section 558, between the first section 551 and the second section 552, between the fourth section 554 and the fifth section 555, and between the fifth section 555 and the sixth section 556. In this case, the ease of flow of leakage magnetic flux in the second damping portion 55 is substantially equal for the path R1, which passes through the first section 551, and the path R2, which passes through the fifth section 555. Thus, the temperature of the first section 551 is substantially the same as the temperature of the fifth section 555.

That is, since the gaps G are provided symmetrically with respect to the imaginary straight line L, the ease of flow of leakage magnetic flux in the second damping portion 55 is substantially equal for the area on one side of the imaginary straight line L in which the first winding 61 is disposed and the area on the other side of the imaginary straight line L in which the second winding 62 is disposed. This allows the temperature of the second damping portion 55 to be substantially equal for the area on one side of the imaginary straight line L in which the first winding 61 is disposed and the area on the other side of the imaginary straight line L in which the second winding 62 is disposed. This prevents the temperature of the second damping portion 55 from being uneven.

In the above-described embodiment, the gap G is provided over the entire second damping portion 55 in the thickness direction. However, the present disclosure is not limited to this configuration. The gap G may be provided only in a part in the thickness direction of the second damping portion 55.

In the above-described embodiment, the gap G is provided over the entire second damping portion 55 in the axial direction of the core 60. However, the gap G is not limited to this configuration. The gap G may be provided only in a part of the second damping portion 55 in the axial direction of the core 60.

In the above-described embodiment, the gap G is provided in the area of the second damping portion 55 on one side of the imaginary straight line L in which the first winding 61 is disposed, and the gap G is not provided in the area on the other side of the imaginary straight line L in which the second winding 62 is disposed, so that the gap G is provided to be asymmetrical with respect to the imaginary straight line L. However, the present disclosure is not limited thereto.

For example, gaps G may be arranged to be asymmetrical with respect to the imaginary straight line L by differentiating the number of the gaps G provided in the area of the second damping portion 55 on one side of the imaginary straight line L in which the first winding 61 is disposed and the number of the gaps G provided in the area on the other side of the imaginary straight line L in which the second winding 62 is disposed.

For example, the gaps G may be arranged to be asymmetrical with respect to the imaginary straight line L by differentiating the width of the gap G provided in the area of the second damping portion 55 on one side of the imaginary straight line L in which the first winding 61 is disposed and the width of the gap G provided in the area on the other side of the imaginary straight line L in which the second winding 62 is disposed.

In the above-described embodiment, the noise reducing unit 50 includes one common mode choke coil 51, one first damping portion 54, and one second damping portion 55. However, the present disclosure is not limited to this.

For example, as shown in FIG. 14, the noise reducing unit 50 may include two common mode choke coils 51 and first damping portions 54, which are respectively provided in the two common mode choke coils 51. That is, the noise reducing unit 50 may include two common mode choke coils 51 and two first damping portions 54.

In this case, the holder 42 includes two tubular portions 46. In the following description, one of the tubular portions 46 will be referred to as a left tubular portion 46, and the other tubular portion 46 will be referred to as a right tubular portion 46. However, the terms "left" and "right" are used for illustrative purposes and do not specifically limit, for example, the positions of the two tubular portions 46 within the device. The direction in which the two tubular portions 46 are arranged agrees with the direction in which the two second walls 462 face each other. In the example shown in FIG. 14, the second wall 462 of the left tubular portion 46 is also the second wall 462 of the right tubular portion 46. That is, the two tubular portions 46 share the second wall 462.

A common mode choke coil 51 and a first damping portion 54 are arranged inside the left tubular portion 46. Another common mode choke coil 51 and another first damping portion 54 are arranged inside the right tubular portion 46. The two common mode choke coils 51 are arranged side by side. In the example shown in FIG. 14, the direction in which the two common mode choke coils 51 are arranged is orthogonal to the direction in which the first winding 61 and the second winding 62 face each other. The first spool portion 601 of the core 60 arranged in the left tubular portion 46 is aligned with the first spool portion 601 of the core 60 arranged in the right tubular portion 46. The second spool portion 602 of the core 60 arranged in the left tubular portion 46 is aligned with the second spool portion 602 of the core 60 arranged in the right tubular portion 46.

The noise reducing unit 50 includes a single second damping portion 55. The second damping portion 55 is on the opposite side of the first damping portion 54 from the common mode choke coil 51, so that the first damping portion 54 is arranged between the second damping portion 55 and the common mode choke coil 51. The second damping portion 55 extends to surround the two common mode choke coils 51 collectively. Thus, the two common mode choke coils 51 are surrounded by the second damping portion 55, which is arranged on the opposite side of the first damping portion 54 from the common mode choke coil 51.

In the example shown in FIG. 14, the second damping portion 55 includes two gaps G for increasing the magnetic resistance in the extending direction. That is, the second damping portion 55 is formed by two separate components. The gaps G are each provided in the second damping portion 55 between a part on the outer surface of the first wall 461 of the left tubular portion 46 and a part on the outer surface of the first wall 461 of the right tubular portion 46. That is, the gaps G are provided symmetrically with respect to the imaginary straight line L.

In this case, leakage magnetic flux p leaking from the core 60 of each of the two common mode choke coils 51 flows through the second damping portion 55. That is, the two common mode choke coils 51 share the second damping portion 55. Since the second damping portion 55 is not arranged between the adjacent common mode choke coils 51, the size of the noise reducing unit 50 is reduced in the direction in which the common mode choke coils 51 are arranged.

If the second damping portion 55 is not provided, the distance between adjacent common mode choke coils 51 affects the resistance value. Specifically, the smaller the distance between adjacent common mode choke coils 51, the greater the resistance value becomes. In contrast, in a case in which the second damping portion 55 is provided as in the above-described configuration, the influence of the arrangement of the second damping portion 55 on the resistance value is sufficiently greater than the influence of the distance between adjacent common mode choke coils 51 on the resistance value. Therefore, compared to a case in which the second damping portion 55 is not provided, the flexibility in the distance between adjacent common mode choke coils 51 is improved.

The noise reducing unit 50 may include three or more common mode choke coils 51 and first damping portions 54, the number of which is equal to that of the common mode choke coils 51. In this case, all the common mode choke coils 51 may be surrounded by the second damping portion 55, which is arranged on the opposite side of the first damping portion 54 from the common mode choke coil 51. In other words, the second damping portion 55 may surround all the common mode choke coils 51 collectively.

The direction in which the two common mode choke coils 51 are arranged may agree with the direction in which the first winding 61 and the second winding 62 face each other.

Each of the two tubular portions 46 may include two second walls 462. That is, the two tubular portions 46 do not necessarily need to share the second wall 462.

The second damping portion 55 does not necessarily need to have the gap G. That is, the second damping portion 55 may have an annular shape that is continuous in the extending direction. In this case, since the second damping portion 55 is not split in the extending direction, the number of components of the noise reducing unit 50 is reduced as compared to a case in which the second damping portion 55 is formed by multiple split components.

The second damping portion 55 may include only one of the two gaps G. That is, the gaps G may be provided to be asymmetrical with respect to the imaginary straight line L. In this case, since the second damping portion 55 is not split, the number of components of the noise reducing unit 50 is reduced as compared to a case in which the second damping portion 55 is formed by multiple split components.

The compression unit 13 is not limited to a scroll type, but may be any type. For example, the compression unit 13 may be a piston type or a vane type.

The motor-driven compressor 10 may be mounted on a fuel cell electric vehicle. In this case, the motor-driven compressor 10 may use the compression unit 13 to compress air, which is a fluid supplied to the fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor, comprising:
a compression unit that is configured to compress a fluid;

a motor that is configured to drive the compression unit;
an inverter device configured to drive the motor; and
a housing that accommodates the compression unit, the motor, and the inverter device, wherein
the inverter device includes:
an inverter circuit unit configured to convert DC power to AC power; and
a noise reducing unit that is provided on an input side of the inverter circuit unit and is configured to reduce common-mode noise and normal-mode noise,
the noise reducing unit includes:
a common mode choke coil that is configured to reduce the common-mode noise;
a smoothing capacitor that forms a low-pass filter together with the common mode choke coil; and
a first damping portion that is made of a nonmagnetic material and is configured to reduce the normal-mode noise,
the common mode choke coil includes:
an annular core;
a first winding that is wound around the core; and
a second winding that is wound around the core and spaced apart from the first winding,
the first damping portion is configured to surround the first winding and the second winding,
the first damping portion is configured such that an induced current flows in the first damping portion to generate magnetic flux that resists changes in leakage flux leaking from the core,
the noise reducing unit further includes a second damping portion that is made of a magnetic material and is configured to reduce the normal-mode noise, and
the second damping portion is disposed on an opposite side of the first damping portion from the common mode choke coil.

2. The motor-driven compressor according to claim 1, wherein the second damping portion extends in a circumferential direction of the core on an outer circumference of the core.

3. The motor-driven compressor according to claim 1, wherein
the inverter device includes a plastic holder including a plate-shaped main body and a tubular portion extending from the main body,
the main body and the tubular portion define an accommodation space, and
the common mode choke coil and the first damping portion are accommodated in the accommodation space such that an axial direction of the core extends in an axial direction of the tubular portion.

4. The motor-driven compressor according to claim 3, wherein the second damping portion is attached to an outer circumferential surface of the tubular portion.

5. The motor-driven compressor according to claim 3, wherein the second damping portion is attached to an inner circumferential surface of the tubular portion.

6. The motor-driven compressor according to claim 3, wherein the second damping portion is disposed between the first damping portion and the main body.

7. The motor-driven compressor according to claim 1, wherein
the common mode choke coil is one of multiple common mode choke coils,
the first damping portion is one of multiple first damping portions respectively corresponding to the common mode choke coils, and
the common mode choke coils are surrounded by the second damping portion.

8. The motor-driven compressor according to claim 1, wherein
the common mode choke coil is surrounded by the second damping portion,
the second damping portion includes multiple gaps configured to increase a magnetic resistance in an extending direction of the second damping portion,
the second winding is disposed to face the first winding in a radial direction of the core,
a straight line that is orthogonal to both of an axial direction of the core and a direction in which the first winding and the second winding face each other, and is located between the first winding and the second winding is an imaginary straight line, and
the gaps are symmetrical with respect to the imaginary straight line.

9. The motor-driven compressor according to claim 1, wherein
the common mode choke coil is surrounded by the second damping portion,
the second damping portion includes one or more gaps configured to increase a magnetic resistance in an extending direction of the second damping portion,
the second winding is disposed to face the first winding in a radial direction of the core,
a straight line that is orthogonal to both of an axial direction of the core and a direction in which the first winding and the second winding face each other, and is located between the first winding and the second winding is an imaginary straight line, and
the one or more gaps are asymmetrical with respect to the imaginary straight line.

* * * * *